(12) United States Patent
Sobel et al.

(10) Patent No.: US 8,937,606 B2
(45) Date of Patent: Jan. 20, 2015

(54) ORTHOGONAL MULTI-ROW TOUCH PANEL STIMULATION

(75) Inventors: David A. Sobel, Los Altos, CA (US); Sumant Ranganathan, Saratoga, CA (US); John S. Walley, Ladera Ranch, CA (US)

(73) Assignee: Broadcom Corporation, Irvine, CA (US)

( * ) Notice: Subject to any disclaimer, the term of this patent is extended or adjusted under 35 U.S.C. 154(b) by 293 days.

(21) Appl. No.: 13/414,985

(22) Filed: Mar. 8, 2012

(65) Prior Publication Data
US 2013/0176271 A1 Jul. 11, 2013

Related U.S. Application Data

(60) Provisional application No. 61/584,491, filed on Jan. 9, 2012.

(51) Int. Cl.
*G06F 3/045* (2006.01)
*G06F 3/044* (2006.01)

(52) U.S. Cl.
CPC ................................. *G06F 3/044* (2013.01)

USPC ........................................................... 345/174

(58) Field of Classification Search
CPC ..................................................... G06F 3/044
See application file for complete search history.

(56) References Cited

U.S. PATENT DOCUMENTS

| | | | |
|---|---|---|---|
| 2008/0158174 A1* | 7/2008 | Land et al. | 345/173 |
| 2012/0062493 A1* | 3/2012 | Land et al. | 345/173 |
| 2013/0127779 A1* | 5/2013 | Lillie et al. | 345/174 |

\* cited by examiner

*Primary Examiner* — Jason Olson
*Assistant Examiner* — Carl Adams
(74) *Attorney, Agent, or Firm* — Brinks Gilson & Lione

(57) ABSTRACT

Control circuitry for a touch panel includes a touch panel interface, a memory comprising scanning logic, and a controller in communication with the memory and the touch panel interface. The controller is operable, when the scanning logic is executed, to energize a first and a second row in the touch panel simultaneously, a first time; obtain a first signal measurement along a column intersecting the first and second rows; energize the first and the second row in the touch panel simultaneously, a second time; obtain a second signal measurement along the column; and determine a first pixel value and a second pixel value along the column from the first signal measurement and the second signal measurement.

20 Claims, 17 Drawing Sheets

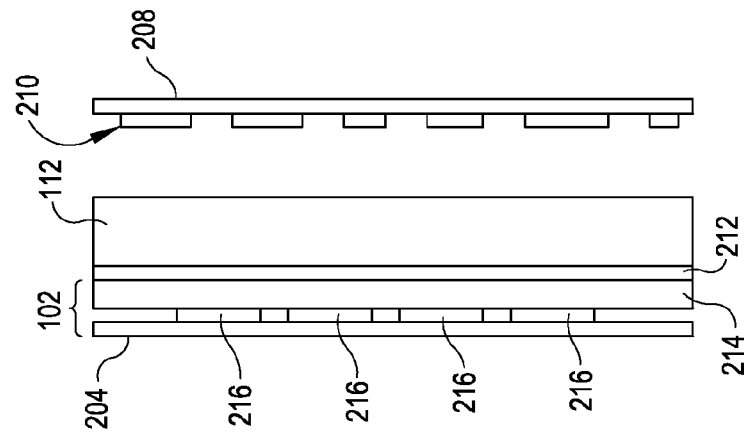
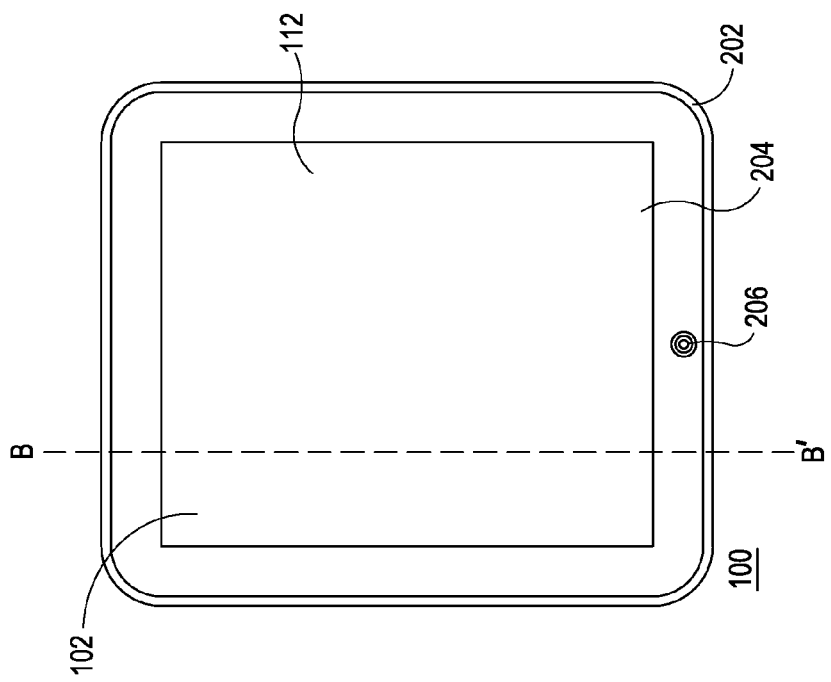
Figure 2B
Figure 2A

ORTHOGONAL MULTI-ROW TOUCH PANEL STIMULATION

CROSS REFERENCE TO RELATED APPLICATIONS

This application claims priority to, and incorporates by reference, U.S. Provisional Application Ser. No. 61/584,491, Titled Orthogonal Multi-Row Touch Panel Stimulation, Filed 9-Jan.-2012.

TECHNICAL FIELD

This disclosure relates to methods and apparatus for capacitive touch screen devices.

BACKGROUND

Continual development and rapid improvement in portable devices has included the incorporation of touch screens in these devices. A touch screen device responds to a user's touch to convey information about that touch to a control circuit of the portable device. The touch screen is conventionally combined with a generally coextensive display device such as a liquid crystal display (LCD) to form a user interface for the portable device. The touch screen also operates with a touch controller circuit to form a touch screen device. In other applications using touch sensing, touch pads may also be part of the user interface for a device such as a personal computer, taking the place of a separate mouse for user interaction with the onscreen image. Relative to portable devices that include a keypad, rollerball, joystick or mouse, the touch screen device provides advantages of reduced moving parts, durability, resistance to contaminants, simplified user interaction and increased user interface flexibility.

Despite these advantages, conventional touch screen devices have been limited in their usage to date. For some devices, current drain has been too great. Current drain directly affects power dissipation which is a key operating parameter in a portable device. For other devices, performance such as response time has been poor, especially when subjected to fast motion at the surface of the touch screen. Some devices do not operate well in environments with extreme conditions for electromagnetic interference and contaminants that can affect performance.

Further limitations and disadvantages of conventional and traditional approaches will become apparent to one of ordinary skill in the art through comparison of such approaches with aspects of the present disclosure as set forth in the remainder of this application and with reference to the accompanying drawings.

BRIEF DESCRIPTION OF THE DRAWINGS

The system may be better understood with reference to the following drawings and description. In the figures, like reference numerals designate corresponding parts throughout the different views.

FIG. 2 is an example top view of a portable device.

DETAILED DESCRIPTION

Figure 1:
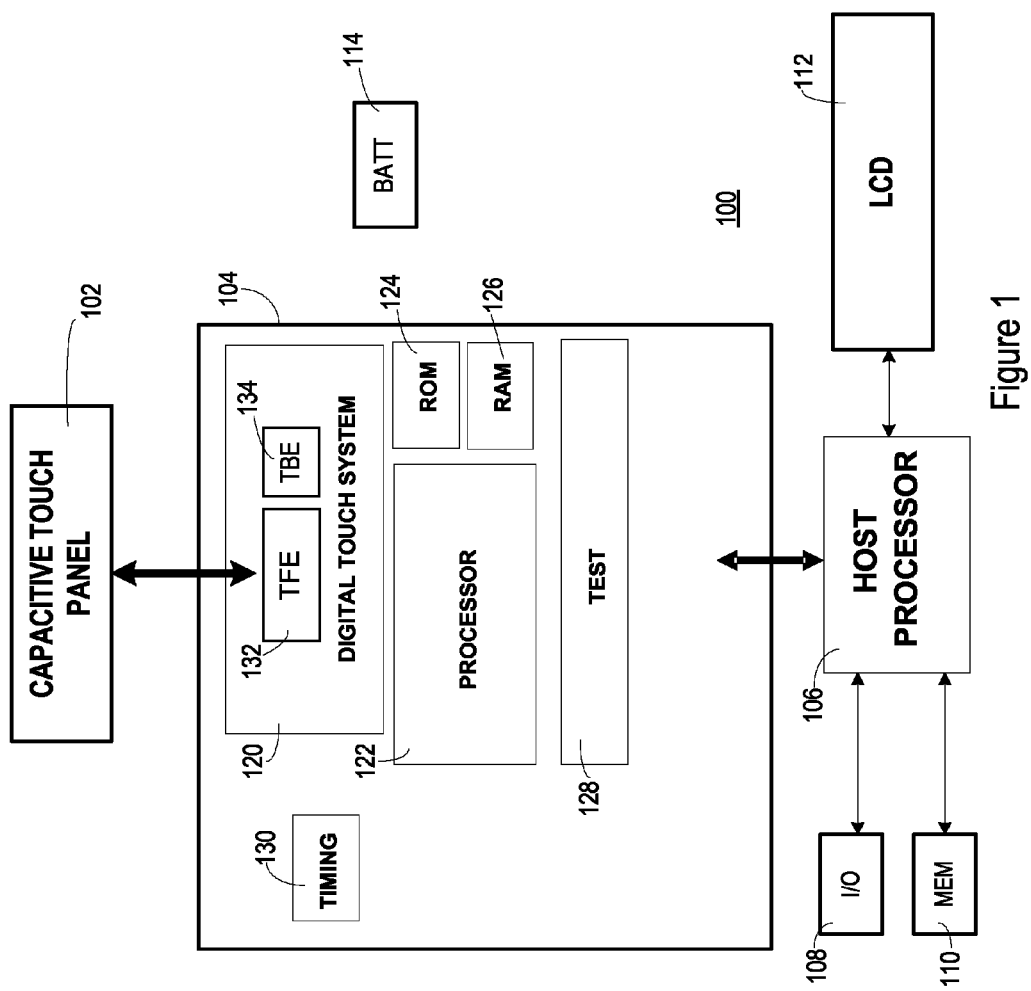
FIG. 1 is an example of a block diagram of a portable device.

Referring now to FIGS. 1 and 2, FIG. 1 shows a block diagram of a portable device 100. FIG. 2 shows one embodiment of a portable device 100 according to the block diagram of FIG. 1. As shown in FIG. 1, the portable device 100 includes a capacitive touch panel 102, a controller circuit 104, a host processor 106, input-output circuit 108, memory 110, a liquid crystal display (LCD) 112 and a battery 114 to provide operating power.

FIG. 2 includes FIG. 2A which shows a top view of the portable device 100 and FIG. 2B which shows a cross-sectional view of the portable device 200 along the line B-B' in FIG. 2A. The portable device may be embodied in a wide range of devices with a touch sensitive display, including, as examples, a tablet computer, a smart phone, music player, or a fixed device such as a kiosk.

The portable device 100 includes a housing 202, a lens or clear touch surface 204 and one or more actuatable user interface elements such as a control switch 206. Contained within the housing are a printed circuit board 208 circuit elements 210 arranged on the printed circuit board 208 and as are shown in block diagram form in FIG. 1. The capacitive touch panel 102 is arranged in a stack and includes a drive line 212, an insulator 214 and a sense line 216. The insulator electrically isolates the drive line 212 and other drive lines arranged parallel to the drive line from the sense lines 216. Signals are provided to one or more of the drive lines 212 and sensed by the sense lines 216 to locate a touch event on the clear touch surface 204. The LCD 112 is located between the printed circuit board 208 and the capacitive touch panel 102.

As is particularly shown in FIG. 2A, the capacitive touch panel 102 and the LCD 112 may be generally coextensive and form a user interface for the portable device. Text and images may be displayed on the LCD for viewing and interaction by a user. The user may touch the capacitive touch panel 102 to control operation of the portable device 100. The touch may be by a single finger of the user or by several fingers, or by other portions of the user's hand or other body parts. The touch may also be by a stylus gripped by the user or otherwise brought into contact with the capacitive touch panel. Touches may be intentional or inadvertent. In another application, the capacitive touch panel 102 may be embodied as a touch pad of a computing device. In such an application, the LCD 112 need not be coextensive (or co-located) with the capacitive touch panel 102 but may be located nearby for viewing by a user who touches the capacitive touch panel 102 to control the computing device.

Referring again to FIG. 1, the controller circuit 104 includes a digital touch system 120, a processor 122, memory including persistent memory 124 and read-write memory 126, a test circuit 128 and a timing circuit 130. In one embodiment, the controller circuit 104 is implemented as a single integrated circuit including digital logic and memory and analog functions.

The digital touch subsystem 120 includes a touch front end (TFE) 132 and a touch back end (TBE) 134. This partition is not fixed or rigid, but may vary according to the high-level function(s) that each block performs and that are assigned or considered front end or back end functions. The TFE 132 operates to detect the capacitance of the capacitive sensor that comprises the capacitive touch-panel 102 and to deliver a high signal to noise ratio (SNR) capacitive image (or heatmap) to the TBE 134. The TBE 134 takes this capacitive heatmap from the TFE 132 and discriminates, classifies, locates, and tracks the object(s) touching the capacitive touch panel 102 and reports this information back to the host processor 106. The TFE 132 and the TBE 134 may be partitioned among hardware and software or firmware components as desired, e.g., according to any particular design requirements. In one embodiment, the TFE 132 will be largely implemented in hardware components and some or all of the functionality of the TBE 134 may be implemented by the processor 122.

The processor 122 operates in response to data and instructions stored in memory to control the operation of the controller circuit 104. In one embodiment, the processor 122 is a reduced instruction set computer (RISC) architecture, for example as implemented in an ARM processor available from ARM Holdings. The processor 122 receives data from and provides data to other components of the controller circuit 104. The processor 122 operates in response to data and instructions stored in the persistent memory 124 and read-write memory 126 and in operation writes data to the memories 124, 126. In particular, the persistent memory 124 may store firmware data and instructions which are used by any of the functional blocks of the controller circuit 104. These data and instructions may be programmed at the time of manufacture of the controller 104 for subsequent use, or may be updated or programmed after manufacture.

The timing circuit 130 produces clock signals and analog, time-varying signals for use by other components of the controller circuit 104. The clock signals include digital clock signal for synchronizing digital components such as the processor 122. The time-varying signals include signals of predetermined frequency and amplitude for driving the capacitive touch panel 102. In this regard, the timing circuit 130 may operate under control or responsive to other functional blocks such as the processor 122 or the persistent memory 124.

Figure 3:
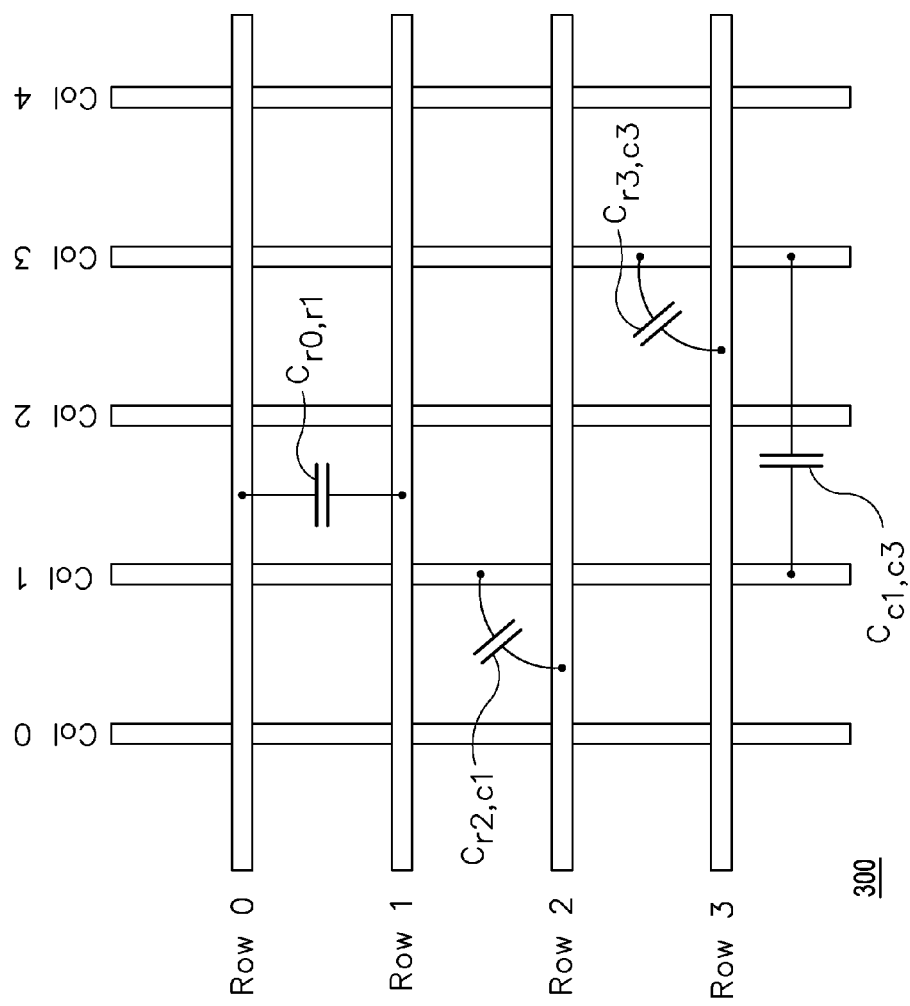
FIG. 3 is a simplified diagram of an example mutual capacitance touch panel for use in the portable device of FIGS. 1 and 2.

FIG. 3 shows a diagram of a typical mutual capacitance touch panel 300. The capacitive touch panel 300 models the capacitive touch panel 102 of the portable device of FIGS. 1 and 2. The capacitive touch panel 300 has $N_{row}$ rows and $N_{col}$ columns ($N_{row}=4$, $N_{col}=5$ in FIG. 3). In this manner, the capacitive touch panel 300 creates $N_{row}$-times- $N_{col}$ mutual capacitors between the $N_{row}$ rows and the $N_{col}$ columns. These are the mutual capacitances that the controller circuit 104 commonly uses to sense touch, as they create a natural grid of capacitive nodes that the controller circuit 104 uses to create the typical capacitive heatmap. However, it is worth noting that there are a total of ($N_{row}+N_{col}$)—or ($N_{row}+N_{col}+2$) nodes if a touching finger or stylus and ground node in the capacitive touch panel 300 are included. A capacitance exists between every pair of nodes in the capacitive touch panel 300.

Stimulus Modes

The capacitive touch panel 300 can be stimulated in several different manners. The way in which the capacitive touch panel 300 is stimulated impacts which of the mutual capacitances within the panel are measured. A list of the modes of operation is detailed below. Note that the modes defined below only describe the manner in which the TFE 132 stimulates the panel.

Row-column (RC) mode is a first operating mode of a mutual capacitive sensor. In RC mode, the rows are driven with transmit (TX) waveforms and the columns are connected to receive (RX) channels of the TFE 132. Therefore, the mutual capacitors between the rows and the columns are detected, yielding the standard $N_{row} \times N_{col}$ capacitive heatmap. In the example shown in FIG. 3, RC mode measures the capacitors label $Cr_{<i>}, C_{<j>}$, where $<i>$ and $<j>$ are integer indices of the row and column, respectively. Generally, there is no incremental value in supporting column-row (CR) mode, (e.g. driving the columns and sensing the rows), as it yields the same results as RC mode.

Self-capacitance column (SC) mode is a self-capacitance mode that may be supported by the controller 102. In SC mode, one or more columns are simultaneously driven and sensed. As a result, the total capacitance of all structures connected to the driven column can be detected.

In column-listening (CL) mode, the RX channels are connected to the columns of the capacitive touch panel 102 and the transmitter is turned off. The rows of the capacitive touch panel 102 will either be shorted to a low-impedance node (e.g. AC ground), or left floating (e.g. high-impedance). This mode is used to listen to the noise and interference present on the panel columns. The output of the RX channels will be fed to a spectrum estimation block (e.g. FFT block) in order to determine the appropriate signal frequencies to use and the optimal interference filter configuration, as will be described in further detail below.

Timing Terminology

Some terminology is introduced for understanding the various timescales by which results are produced within the TFE 132. The TFE 132 produces a capacitive heatmap by scanning all desired nodes of the capacitive touch panel 102 (e.g., all of the nodes, or some specified or relevant subset of all of the nodes). This process may be referred to as a frame scan; the frame scan may run at a rate referred to as the frame rate. The frame rate may be scalable. One exemplary frame rate include a frame rate of 250 Hz for single touch and a panel size less than or equal to 5.0 inches in size. A second exemplary frame rate is 200 Hz for single touch and a panel size greater than 5.0 inches. A third exemplary frame rate is 120 Hz minimum for 10 touches and a panel size of 10.1 inches. Preferably, the controller 104 can support all of these frame rates and the frame rate is configurable to optimize tradeoff of performance and power consumption for a given application. The term scan rate may be used interchangeably with the term frame rate.

The controller circuit 104 may assemble a complete frame scan by taking a number of step scans. Qualitatively, each step scan may result in a set of capacitive readings from the receivers, though this may not be strictly done in all instances. The controller circuit 104 may perform each step scan at the same or different step rate. For a row/column (RC) scan, where the transmitters are connected to the rows and the receivers are connected to the columns, it will take $N_{row}$ step scans to create a full frame scan. Assuming a tablet-sized capacitive touch panel 102 with size 40 rows×30 columns, the step rate may be at least 8 kHz to achieve a 200 Hz frame rate.

For all mutual-capacitance scan modes a touch event causes a reduction in the mutual capacitance measured. The capacitive heatmap that is created by the TFE 132 will be directly proportional to the measured capacitance. Therefore, a touch event in these scan modes will cause a reduction in the capacitive heatmap. For all self-capacitance scan modes, a touch event causes an increase in the capacitance measured. The capacitive heatmap that is created by the TFE 132 will be directly proportional to the measured capacitance. Therefore, a touch event in these scan modes will cause a local increase in the capacitive heatmap.

Figure 4:
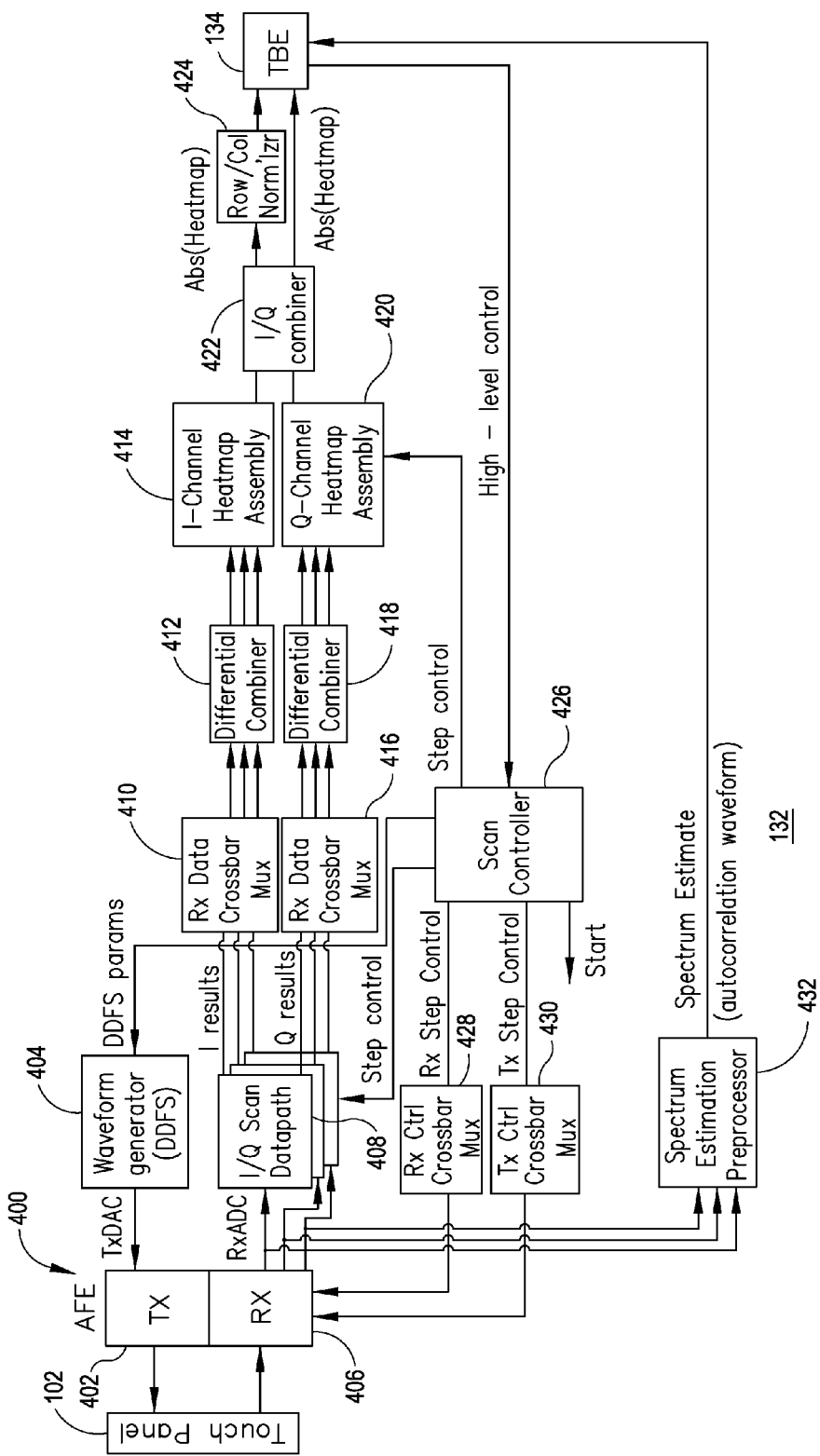
FIG. 4 shows an example block diagram of the touch front end of the portable device of FIG. 1.

Referring now to FIG. 4, it shows a block diagram of the touch front end (TFE) 132 of FIG. 1. In the illustrated embodiment, the AFE 132 includes 48 physical transmit channels and 32 physical receive channels. Additionally, some embodiments of the AFE 132 may contain circuitry such as power regulation circuits, bias generation circuits, and clock generation circuitry. To avoid unduly crowding the drawing figure, such miscellaneous circuitry is not shown in FIG. 4.

The TFE 132 includes transmit channels 402, a waveform generation block 404, receive channels 406 and I/Q scan data paths 408. The transmit channels 402 and the receive channels 406 collectively may be referred to as the analog front end (AFE) 400. The TFE 132 further includes, for the in-phase results from the I/Q scan data path, a receive data crossbar multiplexer 410, a differential combiner 412 and an in-phase channel assembly block 414. Similarly for the quadrature results, the TFE 132 includes a receive data crossbar multiplexer 416, a differential combine 418 and an in-phase channel assembly block 420. The in-phase results and the quadrature results are combined in an I/Q combiner 422. The absolute value of the data is provided to a row and column normalizer 424 and then made available to the touch back end (TBE) 134. Similarly, the heatmap phase information from the I/Q combiner 422 is provided to the TBE 134 as well.

The TFE 132 further includes a scan controller 426, read control crossbar multiplexer 428 and transmit control crossbar multiplexer 430. Further, the TFE 132 includes a spectrum estimation processor 426 as will be described below in further detail. The spectrum estimation processor 426 provides a spectrum estimate to the TBE 134. The scan controller 426 receives high level control signals from the TBE 134 to control which columns are provided with transmit signals and which rows are sensed.

The receive data crossbar multiplexers 410, 416 and the receive control crossbar multiplexer 428 together for a receive crossbar multiplexer. These two multiplexers are used to logically remap the physical receive TFE channels by remapping both their control inputs and data outputs. As such, the control signals routed to both multiplexers may be identical, as the remapping performed by the receive data multiplexers 410, 416 and the receive control multiplexer 428 needs to be identical.

The receive data crossbar multiplexers 410, 416 sit between the output of the I/Q scan data path 408 and the heatmap assembly blocks 414, 420. The purpose of the receive data crossbar multiplexers 410, 416 is to enable the logical remapping of the receive channels. This in turn allows for logical remapping of the electrical connectors such as pins or balls which connect the integrated circuit including the controller 104 to other circuit components of the portable device 100. This will in turn enable greater flexibility in routing a printed circuit board from the integrated circuit including the controller 104 to the capacitive touch panel 102.

Since the I/Q scan data path 408 outputs complex results, the receive crossbar multiplexer may be able to route both the I and Q channels of the scan data path output. This can easily be achieved by instantiating two separate and identical crossbar multiplexers 410, 416. These two multiplexers will share the same control inputs.

The receive control crossbar multiplexer 428 sits between the scan controller 426 and the AFE 400. It is used to remap the per-channel receive control inputs going into the AFE 400. The structure of the receive control crossbar multiplexer 428 may be the same as for the receive data crossbar multiplexer 410, 416.

Since the Rx Ctrl crossbar is used in conjunction with the Rx Data crossbar to logically remap the RX channels, it may be programmed in conjunction with the Rx data crossbar. The programming of the receive control multiplexer 428 and the receive data crossbar multiplexers 410, 416 are not identical. Instead the programming may be configured so that the same AFE to controller channel mapping achieved in one multiplexer is implemented in the other.

The scan controller 426 forms the central controller that facilitates scanning of the capacitive touch panel 102 and processing of the output data in order to create the capacitive heatmap. The scan controller 426 operates in response to control signals from the TBE 134.

Scan Controller Modes of Operation

The scan controller 426 may support many different modes. A brief description of each mode is listed below. Switching between modes is typically performed at the request of the processor 122 (FIG. 1), with a few exceptions noted below.

Active scan mode is considered the standard mode of operation, where the controller 104 is actively scanning the capacitive touch panel 102 in order to measure the capacitive heatmap. Regardless of what form of panel scan is utilized, the scan controller 426 steps through a sequence of step scans in order to complete a single frame scan.

In single-frame mode, the controller initiates one single frame scan at the request of the processor 122. After the scan is complete, the capacitive heatmap data is made available to the processor 122 and the scan controller 426 suspends further operation until additional instructions are received from the processor 426. This mode is especially useful in chip debugging.

In single-step mode, the controller initiates one single step scan at the request of the processor 122. After the scan is complete, the outputs of the scan data path 408 are made available to the processor 122 and the scan controller 426 suspends further operation until additional instructions are received from the processor 122. This mode is especially useful in chip testing and debugging.

Idle scan mode is a mode initiated by the processor 122 in order to run the controller 104 in a lower-performance mode. Typically, this mode will be selected when the controller 122 does not detect an active touch on the screen of the capacitive touch panel 102, but still wants reasonably fast response to a new touch. Therefore, the controller 122 is still active and capable of processing the heatmap data produced by the TFE 132.

The primary differences between active scan mode and idle scan mode are twofold. First, the frame rate in idle scan mode will typically be slower than that used in active scan mode. Duty cycling of the AFE 400 and other power reduction modes will be used in order to reduce total power consumption of the controller 104 during idle scan. Second, the length of time used to generate a single frame scan may be shorter in idle scan mode than in active scan mode. This may be achieved by either shortening the duration of a step scan or by performing fewer step scans per frame. Reducing total frame scan time can further reduce power at the expense of reduced capacitive heatmap signal to noise ratio (SNR).

Spectrum estimation mode is used to measure the interference and noise spectrum coupling into the receive channels. This measurement is then analyzed by the processor 122 to determine the appropriate transmit frequency and calculate the optimal filter coefficients for the filters within the scan data path 408. This mode is typically used with the Column Listening mode.

In spectrum estimation mode, most of the blocks of the TFE 132 in FIG. 4 are disabled. The scan controller 426, the AFE 400, and the spectrum estimation preprocessor 432 may be used. The transmit channel 402 of the AFE 400 is powered down, and the receive channel 406 of the AFE 400 records the background noise and interference signals that couple into the capacitive touch panel 102. The receive data from all of the channels of the AFE 400 are routed to the spectrum estimation preprocessor 432, which performs mathematical preprocessing on this data. The output of the spectrum estimation preprocessor 432 will be an N-point vector of 16-bit results, where N is approximately 200. The output of the spectrum estimation preprocessor 432 is handed off to the processor 122 for further analysis and determination of the appropriate transmit frequency to use. This process is described in greater detail below.

In addition to the functional modes described above, the controller 104 may have a set of sleep modes, where various functional blocks in the controller 104 are disabled and/or powered down completely.

A frame scan includes of a series of step scans. The structure of each step scan may be identical from step scan to the next within a given frame scan; however, the exact values of control data vary from step scan to step scan. Furthermore, the operation of a given frame scan may be determined by configuration parameters and may or may not affected by data values measured by the receive channel. One example of the frame scan logic that the controller circuit 104 may implement is shown below.

```
// Initialization
Set DDFS parameters;
Clear heatmap_memory;
// Step scan loop
For step_idx = 1 to num_step_scans {
    // Configure circuits according to step_idx
    Set scan_datapath_control to scan_datapath_parameters[step_idx];
    Assert Rx_reset and wait TBD clock cycles;
    Set AFE_control_inputs to AFE_parameters[step_idx];
    Deassert Rx_reset and wait TBD clock cycles;
    // Run step scan and collect data
    Send start signal to DDFS and scan data path;
    Wait for TBD clock cycles for step scan to complete;
    Pass datapath_results[step_idx] to heatmap assembly block
    // Incremental heatmap processing
} // step_idx loop
```

The incremental heatmap processing operation is described in greater detail below.

Multi-transmit Support and Block Stimulation of the Panel

In order to achieve improved SNR in the capacitive heatmap, the controller circuit 104 provides support for multi-transmit (multi-Tx) stimulation of the capacitive control panel 102. Multi-Tx simulation (or Multi-Tx) means that multiple rows of the panel are simultaneously stimulated with the transmit (Tx) signal, or a polarity-inverted version of the Tx signal, during each step scan. The number and polarity of the rows stimulated ,may be controlled through control registers in the AFE 400. The number of rows simultaneously stimulated during multi-Tx is defined as a parameter $N_{multi}$. $N_{multi}$ may be a constant value from step-to-step within a given frame and also from frame-to-frame.

If $N_{multi}$ rows are simultaneously stimulated during a step scan, it will take at least $N_{multi}$ step scans to resolve all the pixel capacitances being stimulated. Each receiver has $N_{multi}$ capacitances being stimulated during a scan step. Hence there are $N_{multi}$ unknown capacitances, requiring at least $N_{multi}$ measurements to resolve these values. During each of these $N_{multi}$ steps, the polarity control of the Tx rows will be modulated by a set of Hadamard sequences. Once this set of $N_{multi}$ (or more) step scans is complete, the next set of $N_{multi}$ rows can be stimulated in the same fashion, as $N_{multi}$ will almost always be less than the number of actual rows in the capacitive touch panel 102.

In this way, the processing of the entire capacitive touch panel 102 occurs in blocks, where $N_{multi}$ rows of pixels are resolved during one batch of step scans, and then the next $N_{multi}$ rows of pixels are resolved in the next batch of step scans, until all the panel rows are fully resolved.

In most scenarios, the number of panel rows will not be an exact multiple of $N_{multi}$. In these situations, the number of rows scanned during the final block of rows will be less than $N_{multi}$. However, $N_{multi}$ scan steps may be performed on these remaining rows, using specified non-square Hadamard matrices.

Differential Scan Mode

Differential scan mode is an enhancement to normal scanning mode, whereby the frame scan operation is modified to exploit the correlation of the interference signal received across adjacent receive channels. In this mode, the normal frame scan methodology is performed; however the number of step scans used to assemble a single frame is doubled. Conceptually, each step scan in the scan sequence becomes two step scans: the first is a single-ended or normal step scan with the default values for the AFE control registers, and the second is a differential step scan.

Given $N_{RX}$ receive channels, the differential scan mode yields a total of $2N_{RX}$ receiver measurements per aggregate scan step. (e.g. $N_{RX}$ single-ended measurements and $N_{RX}$ differential measurements.) These $2N_{RX}$ measurements are recombined and collapsed into $N_{RX}$ normal measurements in the Differential Combiner block 412, 418 shown in FIG. 4.

Figure 7:
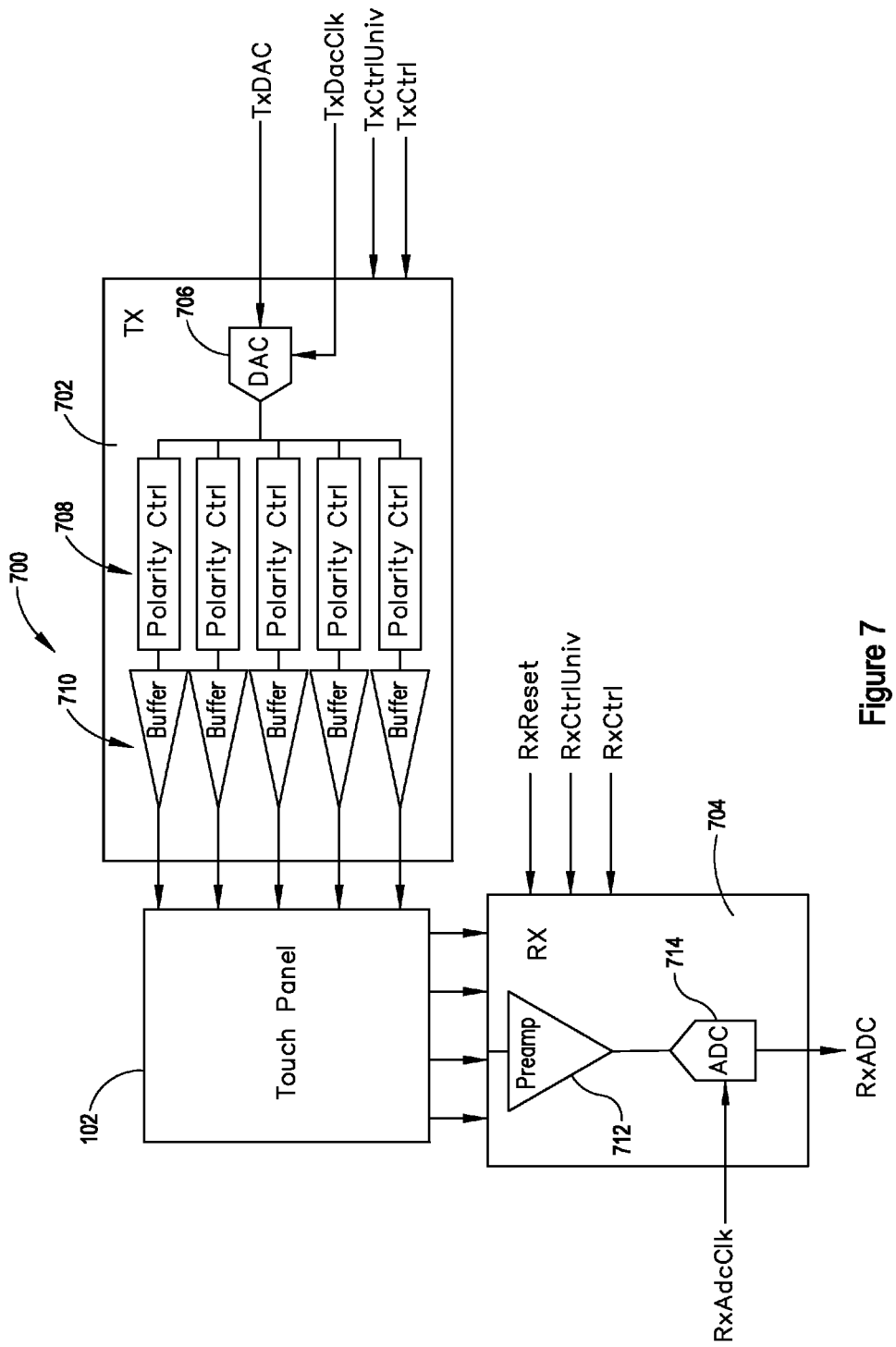
FIG. 7 shows an example of a high-level architecture of the touch front end of the portable device of FIG. 1.

FIG. 7 shows a high-level architecture 700 of the analog front end. The architecture 700 includes a transmit channel 702 providing signals to columns of the capacitive touch panel 102 and a receive channel 704 sensing signals from the capacitive touch panel 102. The transmit channel 702 includes a digital to analog converter 706, polarity control circuits 708 and buffers 710. The receive channel 704 includes a pre-amplifier 712 and analog to digital converter 714.

All transmit channels may be driven by a shared transmit data signal labeled TxDaC in FIG. 7. Each physical transmit channel may also receive a common transmit digital to analog converter clock signal, labeled TxDacClk, to drive the transmit digital to analog converter 706. The clock signal will come directly from a frequency locked loop block within the TFE 132, and this clock signal will also be routed to the digital portion of the TFE 132.

Each physical transmit channel may also have its own set of channel-specific TxCtrl bits that appropriately control various parameters of the transmit channel, such as enable/disable, polarity control, and gain/phase control). These TxCtrl bits are not updated at the TxDacClk rate, but rather are updated between subsequent step scans during the frame scan operation.

A control signal controls the transmit polarity of each of the 48 transmit channels. As will be described in greater detail below, the polarity of the transmit outputs may be modulated in an orthogonal sequence, with each transmit output having a fixed polarity during each scan step during a frame scan.

All receive channels will receive a set of common clock signals. These clock signals are provided directly from a frequency locked loop block within the TFE 132, and this clock signal is also routed to the digital portion of the TFE 132. The clock signals routed to the RX channels include the signal RxADCClk which drives the RxADC. A typical clock frequency for this signal is 48 MHz.

Each physical receive channel will also have its own set of channel-specific receive control bits, labeled RxCtrl in FIG. 7, that appropriately control various parameters of the receive channel, such as enable/disable and gain control. These receive control bits are updated between subsequent step scans during the frame scan operation.

Additionally, there may be a shared set of control settings, labelled RxCtrlUniv in FIG. 7, that will control all receive channels simultaneously. These registers are primarily composed of generic control bits that will remain constant for a given implementation of the controller 104.

There are also one or more reset lines labeled RxReset that are common to all reset channels. These reset lines may be asserted in a repeatable fashion prior to each scan step.

Waveform Generation

The waveform generation block (WGB) 404 in FIG. 4 generates the transmit waveform for the TX channels 402. The WGB 404 generates a digital sine wave. Additionally, WGB 404 may generate other simple periodic waveforms; such as square waves having edges with programmable rise and fall times.

The primary output of the WGB 404 is the data input to the transmit channels 402 labelled TxDAC in FIG. 4. The WGB 404 receives as input signals a clock signal labelled TxDacClk and a signal labelled Start in FIG. 4. Upon receiving the Start signal from the scan controller 426, the WGB 404 begins producing digital waveforms for the duration of a single step scan. At the conclusion of the step scan, the WGB 404 ceases operation and waits for the next start signal from the scan controller 426.

The WGB 404 may have some amount of amplitude control, but the WGB 404 will typically be operated at maximum output amplitude. Therefore, the performance requirements listed below only need to be met at max output amplitude. All signal outputs may be in two's complement format. The WGB 404 may also provide arbitrary sine/cosine calculation capabilities for the scan data path 408 and spectrum estimation preprocessor 432.

The following table lists typical performance for the WGB 404.

| Specification | Min | Nom | Max | Comment |
| --- | --- | --- | --- | --- |
| Clock rate | | 8 MHz | | Will operate at TxDacClk rate |
| Output frequency | 0 Hz | — | 2 MHz | |
| Frequency ctrl resolution | — | 15 bits | — | Desired resolution of ~61 Hz. Can be different. |
| # of output bits | — | 8 | — | |
| Output amplitude | 50% amplitude | 100% amplitude | 100% amplitude | |
| Amplitude ctrl resolution | — | 7 bits | — | Corresponds to 1% stepsize in amplitude control. |
| DC bias control | 0 | 0 | 0 | All outputs should be balanced around 0 |
| Output THD | | | −40 dBFs | Sine wave mode only |
| Rise/fall time | 1 calk cycle @ 8 MHz | — | 256 calk cycles @ 8 MHz | Square-wave mode only. Independent control of rise time vs. fall time NOT required. |

In FIG. 4, the differential combiner blocks 412, 410 provide the capability to operate in differential mode, where the receive channels 406 alternate step scans between single-ended measurements and differential measurements. The purpose of the differential combiner blocks 412, 418 is to combine the $N_{RX}$ single-ended measurements and ($N_{RX}$−1) differential measurements into a single set of $N_{RX}$ final results for use in the heatmap assembly blocks 414, 420 that follow.

The differential combiner blocks 412, 418 are akin to a spatial filter. Let the vector, c, be an $N_{rx}$-by-1 vector of the capacitances to estimate. In differential mode, you have a vector, s, of single-ended measurements and a vector, d, of differential measurements. Hence, an estimate of c, called $c_{est}$, is sought by optimally recombining s and d. Determining the optimal recombination requires substantial computation, but simulations have shown that the following recombination scheme works to within roughly 0.5 dB of optimal performance over the expected range of operating conditions:

$$c_{est,n} = a_1 \cdot s_{n-2} + a_2 \cdot s_{n-1} + a_3 \cdot s_{n+1} + a_1 \cdot s_{n+2} + b_1 \cdot d_{n-1} + b_2 \cdot d_n - b_2 \cdot d_{n+1} - b_1 \cdot d_{n+2}$$

where the subscript n indicates result from the $n^{th}$ receiver channel, and $0 \leq n \leq N_{RX} - 1$.

Furthermore, the coefficients are subject to the following constraints:

$$0 \leq a_1, a_2, a_3 \leq 1$$

$$a_3 = 1 - 2a_1 - 2a_2$$

$$b_1 = a_1$$

$$b_2 = a_1 + a_2$$

Given these constraints, it can be observed that the math operation listed above can be collapsed into two multiplication operations:

$$c_{est,n} = s_n + a_1 \cdot (s_{n-2} - 2s_n + s_{n+2} + d_{n-1} - d_n - d_{n+1} - d_{n+2}) + a_2 \cdot (s_{n-1} - 2s_n + s_{n+1} + d_n - d_{n+1})$$

The equations above assume that the data exists for 2 receivers on either side of the nth receiver. (e.g. $2 \leq n \leq N_{RX} - 3$) Therefore, the equations above may be modified for the two outer edge receive channels on either side. The modifications are quite simple. First, replace any non-existent $s_k$ term with the nearest neighboring $s_j$ term that does exist. Second, replace any non-existent $d_k$ term with 0. Putting these rules together and expressing the mathematics in matrix form, we get:

$$c_{est} = \begin{bmatrix} a_1+a_2+a_3 & a_2 & a_1 & 0 & 0 & -b_2 & -b_1 & 0 & 0 \\ a_1+a_2 & a_3 & a_2 & a_1 & 0 & b_2 & -b_2 & -b_1 & 0 \\ a_1 & a_2 & a_3 & a_2 & a_1 & b_1 & b_2 & -b_2 & -b_1 \\ \vdots & \vdots & \vdots & \vdots & \vdots & \vdots & \vdots & \vdots \\ a_1 & a_2 & a_3 & a_2 & a_1 & b_1 & b_2 & -b_2 & -b_1 \\ 0 & a_1 & a_2 & a_2 & a_2+a_1 & 0 & b_1 & b_2 & -b_2 \\ 0 & 0 & a_1 & a_2 & a_3+a_2+a_1 & 0 & 0 & b_1 & b_2 \end{bmatrix} \begin{bmatrix} s_0 \\ \vdots \\ s_{N_{RX}-1} \\ d_1 \\ \vdots \\ d_{N_{RX}-1} \end{bmatrix}$$

Lastly, while the optimal values of {a1, a2, a3, b1, b2} are dependent upon the precise noise and interference environment, it has been found that the following values for these parameters operate near optimal performance for the expected range of operating environments:

$a_1 = 1/8$ $a_2 = 7/32$ $a_3 = 5/16$ $b_1 = 1/8 \cdot k_{ADC}$ $b_2 = 11/32 \cdot k_{ADC}$ The parameters $b_1$ and $b_2$ above are dependent upon another parameter, $k_{ADC}$. The new parameter, $k_{ADC}$, is dependent upon the value of receive channel analog to digital converter gain (Rx_AdcGain) used during the differential measurement step, as detailed in the table below:

| Rx_AdcGain<1:0> used during differential measurement step | $k_{ADC}$ |
|---|---|
| 00 | 1 |
| 01 | 3/4 |
| 10 | 1/2 |
| 11 | 3/8 |

These a and b coefficients should be programmable by a control source such as firmware that is part of the controller 104, but the default values should be those listed above. The table below indicates the suggested bit width for each coefficient:

| Coefficient | Bit width |
|---|---|
| $a_1$ | 5 |
| $a_2$ | 5 |
| $a_3$ | 5 |
| $b_1$ | 6 |
| $b_2$ | 8 |

The heatmap assembly blocks (HAB) 414, 420 take the step scan outputs from the scan data path 408 or differential combiners 412, 418, if used, and assembles the complete capacitive heatmap that is the major output of the frame scan operation. In order to do so, it may mathematically combine all of the step scan outputs in the appropriate manner to create estimates of the capacitance values of the individual capacitive pixels in the capacitive touch panel 102.

As shown in FIG. 4, there are two separate and identical instantiations of the HAB. A first HAB 414 is for the I-channel data and a second HAB 420 is for the Q-channel data. Each HAB 414, 418 operates on the either the I-channel or Q-channel data in order to create either an I-channel or a Q-channel capacitive heatmap.

Figure 8:
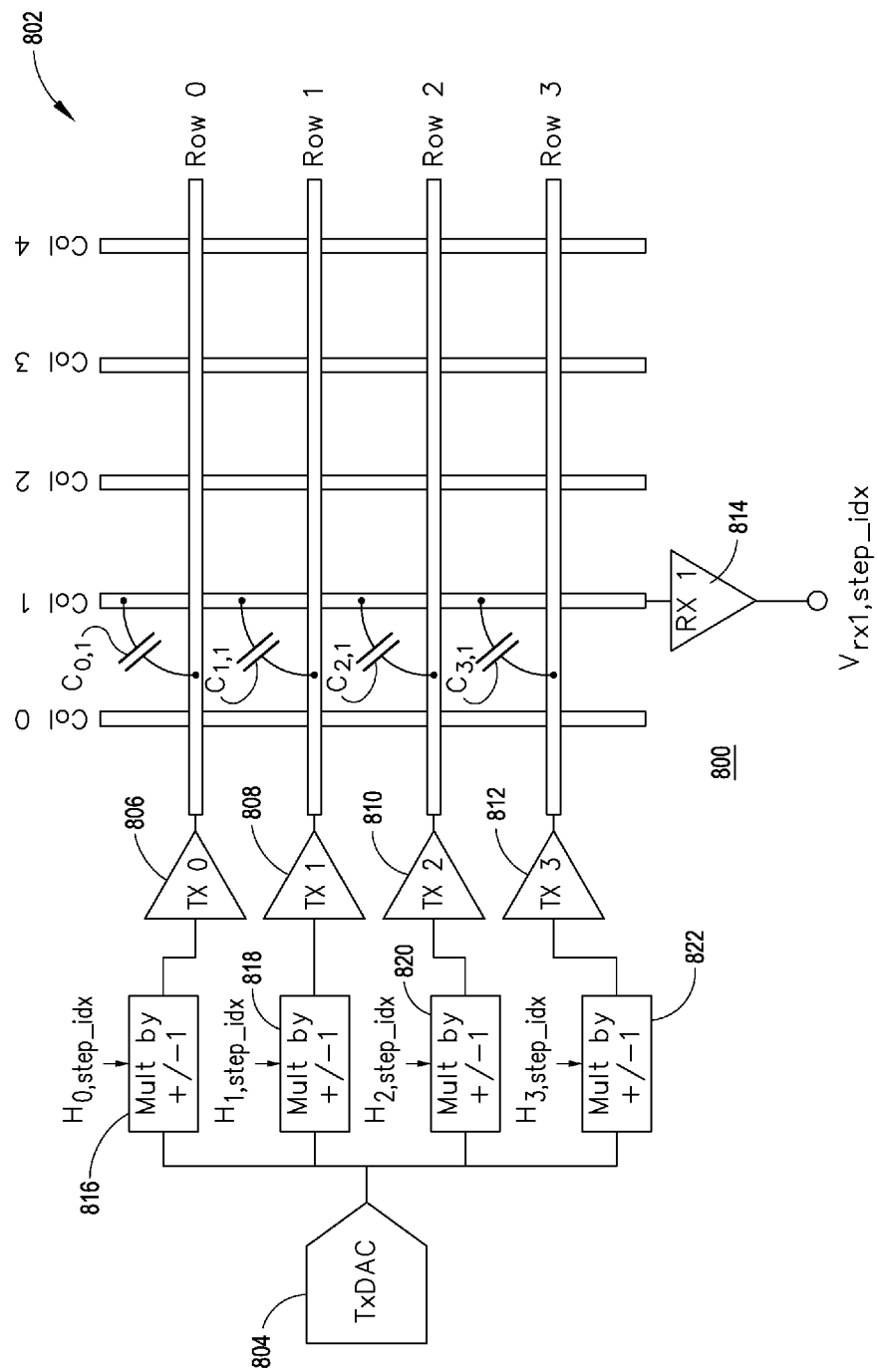
FIG. 8 shows an example of a simplified capacitive touch panel and related circuitry.

In order to demonstrate the mathematics that may apply for heatmap assembly, an example 4×5 capacitive touch panel 800 is illustrated in FIG. 8. In this example, only the capacitive pixels in column 1 are analyzed, but the same principle can be easily extended to each of the five columns in the example capacitive touch panel 800. In particular, the output of receive column j is only affected by capacitance pixels in column j.

The example capacitive touch panel 800 includes a touch panel 802, a transmit digital to analog converter (TxDAC) 804, transmit buffers 806, 808, 810, 812, and a receive analog to digital converter 814. The transmit buffers 806, 808, 810, 812 each have an associated multiplier 816, 818, 820 822, respectively. The multipliers 816, 818, 820 822 operate to multiply the applied signal from the TxDAC by either +1 or −1.

In the example of FIG. 8, a single TxDAC waveform is sent to all four transmit buffers 806, 808, 810, 812. However, each buffer multiplies this waveform by either +1 or −1 before transmitting it onto the row of the touch panel 802. For a given step scan (indicated by the subscript "step_idx"), each value of Hi,step_idx is held constant. But for subsequent step scans in the scan sequence, these values may change. Therefore, at a given step index, the voltage received at $m^{th}$ Rx channel is:

$$V_{step\_idx,m} = V_{TX} \cdot RxGain_m \sum_{n=0}^{NumRows-1} H_{n,step\_idx} \cdot C_{n,m}$$

where $V_{TX}$ is the amplitude of the transmit signal and $RxGain_m$ is the gain of the receive channel m. In order to simplify the analysis, these two parameters are assumed to be equal to 1 and ignored in subsequent calculations.

As can be seen by this equation above, $V_{step\_idx,m}$ is based on NumRows (e.g. 4) unknown values, $C_{n,m}$, with n=0 to 3 in this example. Therefore, if four independent step scans are performed with four independent H sequences applied to the four transmit buffers 806, 808, 810, 812, the relationship between V and C can be inverted in order to estimate the C values from V. In matrix form, this can be written:

$$V_m = H \cdot C_m$$

$$V_m = \begin{bmatrix} V_{0,m} \\ V_{1,m} \\ \vdots \\ V_{NumSteps-1,m} \end{bmatrix}$$

$$H^{NumSteps,NumRows} = \begin{bmatrix} H_{0,0} & \cdots & H_{0,NumRows-1} \\ \vdots & \ddots & \vdots \\ H_{NumSteps-1,0} & \cdots & H_{NumSteps-1,NumRows-1} \end{bmatrix}$$

$$C_m = \begin{bmatrix} C_{0,m} \\ C_{1,m} \\ \vdots \\ C_{NumRows-1,m} \end{bmatrix}$$

In this formulation, the column vector $C_m$ represents the capacitance of the capacitive pixels in the $m^{th}$ column of the capacitive touch panel. H is a NumSteps×NumRows matrix, where the $n^{th}$ column of the H-matrix represents the multiplicative sequence applied to the $n^{th}$ transmit row. The optional superscript of H indicates the dimensions of the H matrix. $V_m$ is a column vector, where the $n^{th}$ entry in the matrix is the $n^{th}$ step scan output of $m^{th}$ RX channel.

In the present application, H is a special form of matrix, called a modified Hadamard matrix. These matrices have the property that:

$$H^T \cdot H = NumSteps \cdot I$$

where I is the NumRows×NumRows identity matrix, and $H^T$ is the transpose of H.

Given the formulation above, and the properties of the H-matrix, the relationship from $C_m$ to $V_m$ can be inverted in order to extract out the values of the $C_m$ vector from the $V_m$ measurements. Using the terminology defined above:

$$C_m = \frac{1}{NumSteps} H^T \cdot V_m$$

In the example above, the panel had four rows and the value of NumSteps (equivalently $N_{multi}$) was also set to four. Therefore, all panel rows were stimulated during every step scan. In general, the number of panel rows will be larger than the value of $N_{multi}$. In that case, the panel stimulation is broken up into blocks. During each block of $N_{multi}$ step scans, $N_{multi}$ adjacent rows are stimulated with the Hadamard polarity sequencing described above.

The heatmap assembly block 414, 420 works on each block of $N_{multi}$ scans independently in order to create the complete heatmap output. For instance, if there were twelve panel rows and $N_{multi}$ were set to four, then the first four step scans would be used to stimulate and assemble the first four rows of the capacitive heatmap; the next four step scans would be for the fifth through eighth panel rows; and the last four step scans would be for the ninth through twelfth panel rows. Therefore, for each block of $N_{multi}$ rows, the heatmap assembly block operates in the exact same manner as defined above. However, the outputs of the HAB 414, 420 are mapped to the subsequent rows in the complete capacitive heatmap.

The heatmap assembly block 414, 420 is capable of assembling a 32-column-wide heatmap, as there are a total of 32 receiver channels implemented in one embodiment. However, in many cases, the capacitive touch panel used will not have 32 columns, and hence not all 32 receive channels are used.

Mathematical Extensions for Asymmetric Panel Scanning

As described above, the controller 104 preferably has the capability to perform asymmetric panel scans, where the firmware supporting operation of the controller 104 has the capability to define the number of times each row is to be scanned. Given the formulation for asymmetric panel scanning outlined above, the changes to the heatmap assembly operation in order to support this feature are minimal.

As described above, the heatmap is assembled in a blocks of $N_{multi}$ rows. In asymmetric scanning, $N_{multi}$ can vary on a block-by-block basis. Therefore, the old equation of:

$$C_m = \frac{1}{NumSteps} H^T \cdot V_m$$

is still valid. However, with asymmetric scanning, the dimensions of C, V, and H and the value of NumSteps change on a block-by-block basis.

The I/Q combiner 422 shown in 4 is used to combine the I- and Q-channel heatmaps into a single heatmap. The primary output of the I/Q combiner 422 is a heatmap of the magnitude (e.g. Sqrt[$I^2+Q^2$]). This is the heatmap that is handed off to the touch back end 134.

The row/column normalizer 424 shown in FIG. 4 is used to calibrate out any row-dependent or column-dependent variation in the panel response. The row/column normalizer 424 has two static control input vectors, identified as RowFac and ColFac. RowFac is an Nrow-by-1 vector, where each entry is 1.4 unsigned number (e.g. LSB=$\frac{1}{16}$. Range is 0 to 31/16 ). ColFac is an Ncol-by-1 vector, where each entry has the same dimensions as RowFac.

If the input data to the Row/Column Normalizer block is labeled as HeatmapIn(m,n), where m is the row index and n is the column index, the output of the block should be:

HeatmapOut(*m*,*n*)=HeatmapIn(*m*,*n*)·RowFac(*m*)·ColFac(*n*)

In one embodiment, the controller 104 has the capability to allow RowFac and ColFac to be defined either by OTP bits or by a firmware configuration file. The OTP settings will be used if the manufacturing flow allows for per-module calibration, thus enabling the capability to tune the controller 104 on a panel-by-panel basis. If RowFac and ColFac can only be tuned on a per-platform basis, then the settings from a firmware configuration file will be used instead.

Spectrum Estimation

The spectrum estimation preprocessor 432 operates to determine the background levels of interference that couple into the receive channels 406 so that the controller 104 may appropriately select transmit frequencies that are relatively quiet or interference free.

The spectrum estimation preprocessor 432 will generally only be used during SEM mode, so it is not part of the standard panel-scan methodology. Instead, the spectrum estimation preprocessor 432 will be used when conditions indicate that SEM should be invoked. At other times, the spectrum estimation preprocessor 432 can be powered down.

Baseline Tracking and Removal Filter

A touch event should be reported when the measured capacitance of a capacitive pixel (or group of pixels) changes by a large enough amount in a short enough period of time. However, due to slow environmental shifts in temperature, humidity or causes of drift, the absolute capacitance of a pixel (or group of pixels) can change substantially at a much slower rate. In order to discriminate changes in pixel capacitance due to a touch event from changes due to environmental drift, a baseline tracking filter can be implemented to track the changes in the baseline (e.g. "untouched" or "ambient" value of the capacitance), and simple subtraction of the baseline capacitance from the input capacitance will yield the change in capacitance due to the touch event.

Figure 9:
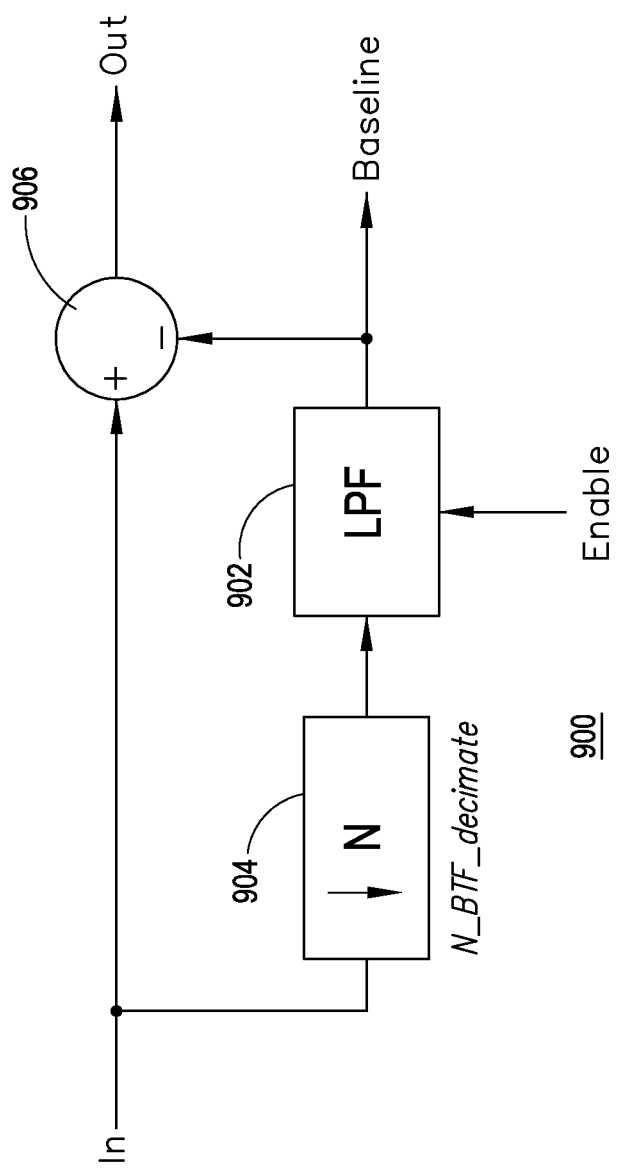
FIG. 9 illustrates an example baseline tracking filter or use in a controller circuit for a portable device.

FIG. 9 illustrates a baseline tracking filter 900. The filter 900 includes a low-pass filter (LPF) 902, a decimator 904 and a combiner 906. The input signal to the filter 900 is provided to the combiner 906 and the decimator 904. The output signal of the decimator is provided to the input of the LPF 902. The output of the LPF 902 is combined with the input signal at the combiner 906. The LPF 902 has an enable input for controlling operation of the filter 900.

The LPF 902 in the baseline tracking filter 900 is used to improve the estimate of the baseline capacitance value. One embodiment uses a simple finite impulse response (FIR) moving average filter of length N (aka "comb filter"), such as:

$$H_N(z) = \frac{1}{N} \cdot \frac{1-z^{-N}}{1-z^{-1}} = \frac{1}{N} \cdot \sum_{n=0}^{N-1} z^{-n}$$

Another embodiment a 1-tap infinite impulse response (IIR) filter, also referred to as a modified moving average, with response:

$$H_k(z) = \frac{\frac{1}{k}}{1-\left(1-\frac{1}{k}\right)z^{-1}}$$

The FIR embodiment of the filter 902 may be used upon startup and recalibration of the baseline value, as it can quickly acquire and track the baseline value. The IIR embodiment of the filter 902 should be used once the baseline value is acquired, as it can be a very computationally efficient means to implement a low-pass filter, particularly if k is chosen to be a power of 2. By increasing the value of k, one can set change the signal bandwidth of the filter to arbitrarily small values with minimal increase in computational complexity.

Filter 900 has two outputs, labeled "Out" and "Baseline" in FIG. 9. The Baseline output is the estimate of the current baseline (aka "ambient" or "untouched") capacitance of the particular panel pixel(s) being scanned, and the "Out" output is the baseline-corrected value of that capacitance measurement. The "Out" value is what should be used in the subsequent touch-detection logic.

The LPF 902 in FIG. 9 has an enable signal in order to shut down the LPF 902 when a touch event is detected. This is provided so that the baseline output is not corrupted by spurious data, most likely from a touch event. If the enable signal is low, the LPF 902 will hold its previous output without updating its output with the incoming data, effectively ignoring the incoming data. Once the enable signal is high, the LPF 902 will continue to update its output with the incoming data. Logic for generating the enable signal is detailed in the following equation:

Enable=(Out≤PosLPFThresh)&
&(Out≥NegLPFThresh)

where PosLPFThresh and NegLPFThresh are configurable parameters.

In a mutual-capacitance scan mode, where a touch event causes a reduction in the input data, the NegLPFThresh should be set to $k_T$*Touch Thresh, where $0<k_T<1$ and Touch Thresh is the touch-detection threshold defined below. These may both be programmable parameters. In a mutual-capacitance scan mode, there is no expected physical mechanism that would cause the input data to exhibit a positive transient. Therefore, PosLPFThresh may be a programmable parameter used to filter out spurious data, should an unexpected positive transient occur.

Programmable Update Rate

The timescale of most baseline drift phenomena will be far slower than the frame rate of the touch panel scan. For instance, observed baseline drift devices had timescales on the order of 1 hour or longer, whereas the frame rate of a current device may be on the order of 200 frames/second. Therefore, in order to reduce the computation for baseline tracking, the controller circuit 104 shall have the capability to scale the update rate of the baseline tracking filter 900. The device may do this by using the decimator 904 to decimate the data fed to the filter 900, so that the filter 900 only operates on every N_BTF_decimate frames of heatmap data, where N_BTF_decimate is a programmable parameter. Therefore, the Baseline signal in FIG. 9 will update at this slower rate. However, the baseline corrected output signal ("Out" in FIG. 9) may be calculated for every frame.

Baseline tracking needs to exercise special care when spectrum estimation mode (SEM) is invoked. SEM may cause a configuration change in the analog front end which in turn will alter the gain in the transfer function (e.g. from capacitance values to codes) of the touch front end. This, in turn, may cause abrupt changes in the capacitive heatmap to occur that could be accidentally interpreted as touch events.

A touch event is detected when the baseline-corrected output exhibits a significant negative shift. The shift in this output may be larger than a programmable parameter, called Touch-Thresh. Furthermore, since the controller circuit 104 may scan a panel at upwards of 200 Hz and a human finger or metal stylus moves at a much slower timescale, a programmable amount of debounce, dubbed TouchDebounce, should also be included. Therefore, before a touch is recognized, the output of the baseline filter may be more negative than TouchThresh for at least TouchDebounce frames. It is likely that TouchDebounce will be a small value, in order that the total touch response time is faster than 10 ms.

Heatmap Noise Estimation

Figure 10:
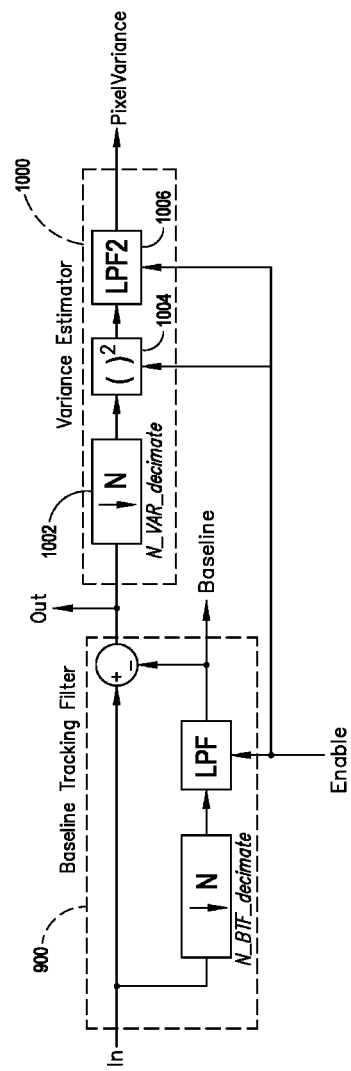
FIG. 10 shows an example first variance estimator in conjunction with the baseline tracking filter of FIG. 9.

The touch back end 134 requires an estimate of the noise level in the capacitive touch panel 102 in order to properly threshold the touch blobs during the detection process. The noise level can be detected by observing noise at the output of the baseline tracking filter as shown in FIG. 10. FIG. 10 shows a first variance estimator 1000 in conjunction with the baseline tracking filter 900 of FIG. 9. In FIG. 10, the baseline tracking filter 900 has its Out output coupled to an input of the variance estimator 1000. The variance estimator 1000 includes a decimator 1002, a signal squarer 1004 and a low-pass filter 1006. The variance estimator 1000 in this embodiment is simply a mean-square estimator, as the output of the baseline tracking filter 900 is zero-mean. Hence the mean-square is equal to the variance.

In order to lower the computational requirements for the variance estimator 900, the data entering the variance estimator can be decimated in the decimator 1002 by the factor, N_VAR_decimate. The low-pass filter 1006 in the variance estimator 1000 may either be a comb-filter or a modified-moving-average filter. The length of the response of the filter 1006 may be a programmable parameter, averaging data over as many as 100 or more frames. In order to lower memory requirements, the MMA filter may be preferred.

As with the baseline tracking filter 900, the LPF 1006 in the variance estimator 1000 has an input for an enable signal. The enable signal is low when the pixel in question is being touched. Otherwise, the variance estimate will be corrupted by the touch signal. When the enable signal is low, the LPF 1006 should retain state, effectively ignoring the data coming into the variance estimator 1000.

The output of the variance estimator 1000 is the variance of one single pixel in the capacitive touch panel 102. Therefore, this provides an independent variance estimate of each pixel in the panel. To get an estimate of the variance across the panel 102, the controller circuit 104 may average the per-pixel variances across the entire frame.

Figure 11:
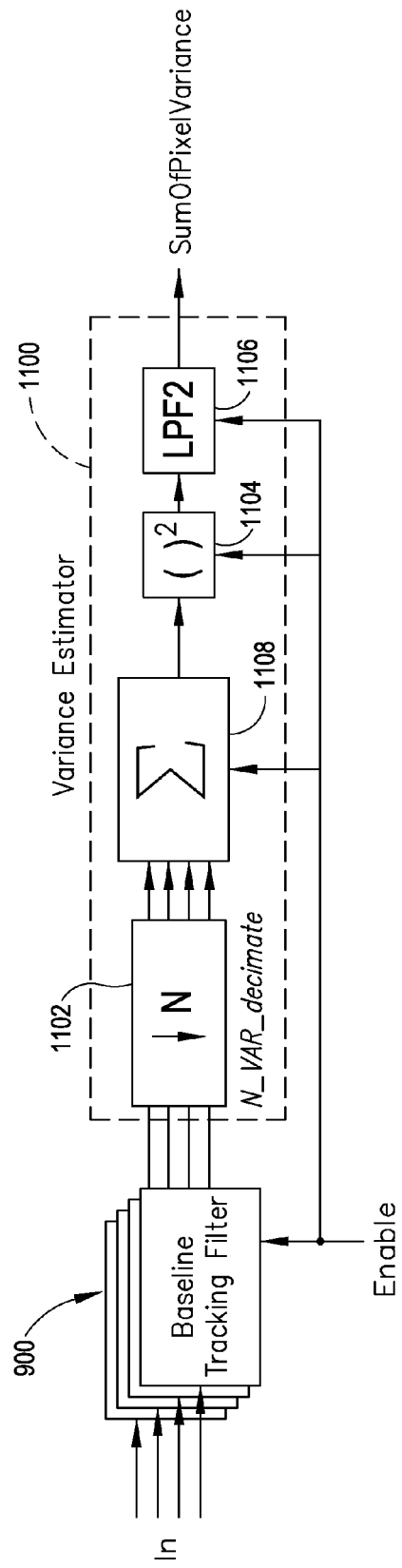
FIG. 11 shows an example second variance estimator in conjunction with the baseline tracking filter of FIG. 9.

Alternately, if only a single per-frame variance estimate is needed, the controller circuit 104 can follow the approach shown in FIG. 10. FIG. 11 shows a second variance estimator 1100 in conjunction with the baseline tracking filter 900 of FIG. 9. In FIG. 11, all the per-pixel baseline tracking filters are grouped as baseline tracking filters 900, on the left in the figure. All the baseline-corrected outputs from the baseline tracking filters 900 are passed to the variance estimator 1100.

Like the variance estimator 1000 of FIG. 10, the variance estimator 1100 includes a decimator 1102, a signal squarer 1104 and a low-pass filter 1106. The variance estimator 1100 further includes a summer 1108. The variance estimator 1100 combines the outputs of the baseline tracking filters 900 into a single value by summing the baseline-corrected outputs across the entire frame in the summer 1108. This averaged value is then passed to the same square-and-filter estimator that was described above, formed by the signal squarer 1104 and the low-pass filter 1106. Assuming that the noise is uncorrelated from pixel-to-pixel, the output of the variance estimator 1100 is equal to the sum of all the pixel variances reported by the block diagram in FIG. 10. In order to generate the average pixel variance across the panel, this result may be divided by the total number of pixels in the capacitive touch panel 102. To generate an estimate of the standard-deviation of the noise, the controller circuitry 104 may take the square root of the variance.

Figure 12:
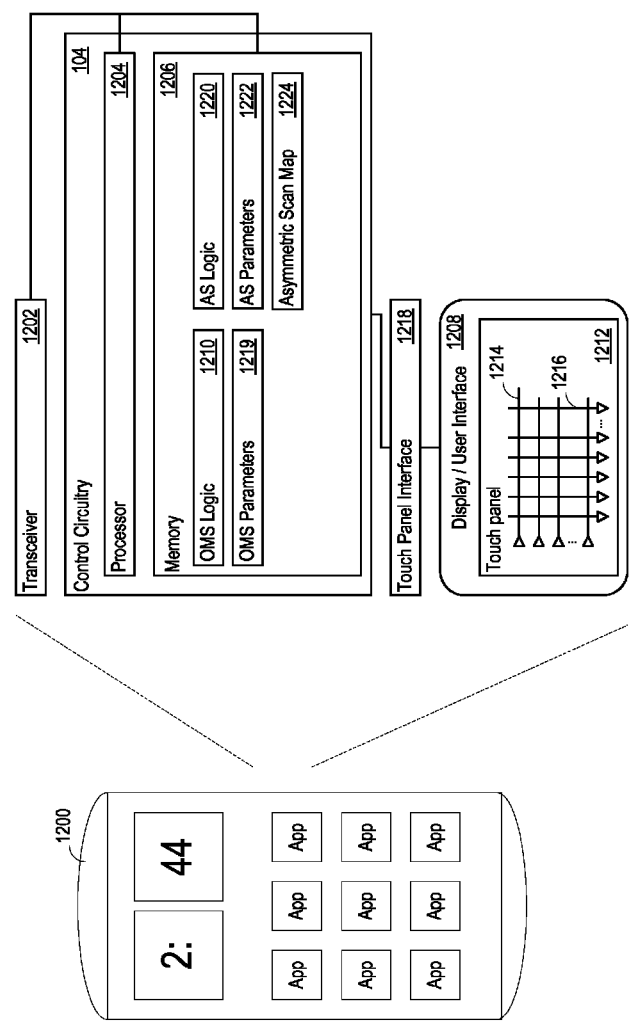
FIG. 12 shows an example smartphone that employs orthogonal multi-row stimulation logic and asymmetric scanning logic.

In one implementation, the controller circuit 104 implements orthogonal multi-row stimulation of the touch panel. One specific example is described with reference to FIG. 12 in the context of a smartphone 1200 (although the techniques may be implemented in any device with a touch panel). The smartphone 1200 includes a transceiver 1202 and the control circuitry 104, including one or more processors 1204, a memory 1206, and a user interface 1208. The transceiver 1202 may be wireless transceiver, and the transmitted and received signals may adhere to any of a diverse array of formats, protocols, modulations, frequency channels, bit rates, and encodings Thus, the transceiver 1202 may support the 802.11a/b/g/n/ac standards, the 60 GHz WiGig/802.11TGad specification, Bluetooth, Global System for Mobile communications (GSM), Time Division Multiple Access (TDMA), Frequency Division Multiple Access (FDMA), Code Division Multiple Access (CDMA), or other wireless access techniques or protocols.

The processor 1204 executes the orthogonal multi-row stimulation ("OMS") logic 1210. The OMS logic 1210 may be part of an operating system, an application program, firmware, or other logic. The user interface 1208 includes a capacitive touch panel 1212 which is divided into a grid of rows 1214 and columns 1216 (and as also shown, for example, in FIG. 3). For the sake of illustration, the transmitters are connected to the rows 1214 and the receivers are connected to the columns 1216, however, that arrangement may be reversed. At each intersection of row and column (referred to as a pixel), there is a capacitance that is impacted by the presence or absence of a finger, stylus, or any other conductive touching object. The capacitance value at each pixel provides the "heat map" of capacitance across the touch panel 1212, and may be envisioned as a contour map of the touch panel 1212 in which the values are the capacitance values at each pixel.

Traditionally, to obtain the capacitance value at each pixel, each row of the touch panel 1212 is sequentially energized (i.e., one at a time) by its transmitter, and the receivers across the row, for each column, determine the capacitance values for the pixels in the energized row. Thus, the touch panel 1212 is scanned one row at a time. Accordingly, if there are 'n' rows, it takes 'n' scans to image the entire touch panel 1212. Assuming for the sake of illustration that there is a one millisecond time window in which to image the entire touch panel 1212 (for a frame rate of 1000 frames per second), and there are 10 rows, then each row receives energy for some fraction of the total scan time window, e.g., 1/10th of a millisecond. If a faster frame rate is desired, then the duration of each row scan must be reduced to less than 1/10th of a millisecond. Doing so, however, decreases the signal to noise ratio (SNR) because less time is spent sending power into any particular pixel. Accordingly, there is a tradeoff between frame rate and SNR with single row scanning.

The OMS logic 1210, however, energizes multiple rows simultaneously. The multiple rows may be consecutive or non-consecutive. In addition, the OMS logic 1210 energizes the rows in a linearly independent and orthogonal way that allows the OMS logic 1210 to recover the individual capacitance values at the multiple pixels over the multiple rows on the same column. The OMS logic 1210 may energize the touch panel 1210 through the touch panel interface 1218. The touch panel interface 1218 may be implemented as described above (e.g., with regard to the front end 132 and back end 134 and FIG. 7, including polarity and amplitude control).

Taking a specific example using two rows, the OMS logic 1210 may energize, during a first scan cycle, the first row and the second row with positive polarities, resulting in a first receiver measurement along the column of Row1+Row2. On the second scan cycle, the OMS logic 1210 may energize the first row with a positive polarity and the second row with a negative polarity, resulting in a second receiver measurement along the column of Row1−Row2. With two variables and two unknowns, these two equations can be solved to obtain the individual values of Row1 and Row2: Row1=(first measurement+second measurement)/2; and Row2=(first measurement−second measurement)/2.

Note that although two measurements are obtained to determine the two pixel values, one benefit is that the signal to noise ratio (SNR) is increased. One reason for the increase is that every measurement will include some noise, and the averaging of the measurements tends to average out the random noise, resulting in less noise influencing the results. This signal is coherent and does not average out.

As a result, the OMS logic 1210 achieves a higher SNR at the same frame rate as the single row at a time scanning technique. Furthermore, the OMS logic 1210 may achieve approximately the same SNR as the single row scanning technique by reducing the amount of time spent driving each row. Thus, the OMS logic 1210 facilitates higher SNR measurements at the same frame rate, or about the same SNR at faster frame rates, compared to the single row at a time scanning technique. The OMS logic 1210 may execute in response to a command or request (from a host processor, for example) to increase SNR.

In support of the OMS logic 1210, the memory 1206 may store OMS parameters 1219 that determine the frame rate, desired SNR, drive time for the rows, or other parameters under which the OMS logic 1210 operates. The control circuitry 104 may drive the touch panel with sinusoidal waveforms, square wave waveforms, or other preferably orthogonal waveform types.

The OMS logic 1210 may scan the touch panel 1212 in consecutive rows forming blocks. For example, rows 0 then 1, then rows 2 and 3, and so on. Alternatively, the OMS logic 1210 may scan the touch panel 1212 at non-consecutive rows. The OMS logic 1210 may scan as many rows simultaneously as the OMS logic 1210 has orthogonal signal sets. For example, given 48 orthogonal signal sets, the OMS logic 1210 may scan up to 48 rows simultaneously. In one implementation, the OMS logic 1210 supports scanning 1 to 16 rows simultaneously, but other implementations may scan more than 16 rows at a time.

In one implementation, the touch panel interface 1218 includes an output driver for each row 1214. Each driver may use a sinusoidal waveform of the same frequency or different frequencies, or more generally use orthogonal waveforms to drive different rows. The touch panel interface 1218 may further include independent gain control on each driver output in order to control the polarity and gain of the waveforms. Thus, the orthogonality of the waveforms may be accomplished by polarity control, amplitude control (e.g., amplitude modulation), phase control, waveform shape control, or in any other way for building orthogonal signals.

In one implementation, the OMS logic 1210 scans the touch panel 1208 using Hadamard codes implemented using amplitude modulation. In this regard, the amplitude modulation creates signals that are +1 or −1 waveforms (e.g., as opposed to complex valued waveforms). With respect to the signal measured at the receivers, the driving signals are additive (e.g., driving with +1, +1 signals results in about twice the signal (e.g., a +2 signal) at the receiver, and driving with +1, −1 signals results in very low level of signal at the receiver). One goal is to maximize the dynamic range at the receiver. In that regard, it is desired for the useful part of the signal to take up the dynamic range of the receiver. Accordingly, for some of the higher order multi-row stimulations, the OMS logic 1210 employs signal sets that (when arranged in matrix form) have minimized absolute value of the column sums, so that the gain on the receiver pre-amps in the touch panel interface 1218 do not need to be reduced significantly and expose the signal to quantization noise that detrimentally impacts the receiver measurements. The orthogonal signal sets may be represented by Hadamard matrices or modified Hadamard matrices. The Hadamard matrices have the property that H*H'=N*I (for N rows), in other words, the rows are orthogonal.

The H4 Hadamard matrix, below, shows one alternative, with a maximum absolute value of the column sum of 4. The second H4 matrix, H'4, below is a modified Hadamard matrix in which the maximum absolute value of column sum is 2. Accordingly, the peak amplitude received is 2. Therefore, the amplifier gain can be increased, which beneficially increases dynamic range and SNR for the subsequent analog to digital conversion. Such matrices may be found by a brute force or exhaustive search for any number of rows.

$$H_4 = \begin{bmatrix} +1 & +1 & +1 & +1 \\ +1 & -1 & +1 & -1 \\ +1 & +1 & -1 & -1 \\ +1 & -1 & -1 & +1 \end{bmatrix}$$

$$\text{Max}(|ColSum[H_4]|) = 4$$

$$H'_4 = \begin{bmatrix} -1 & -1 & -1 & -1 \\ +1 & -1 & +1 & -1 \\ +1 & +1 & -1 & -1 \\ +1 & -1 & -1 & +1 \end{bmatrix}$$

$$\text{Max}(|ColSum[H'_4]|) = 2$$

Figure 13:
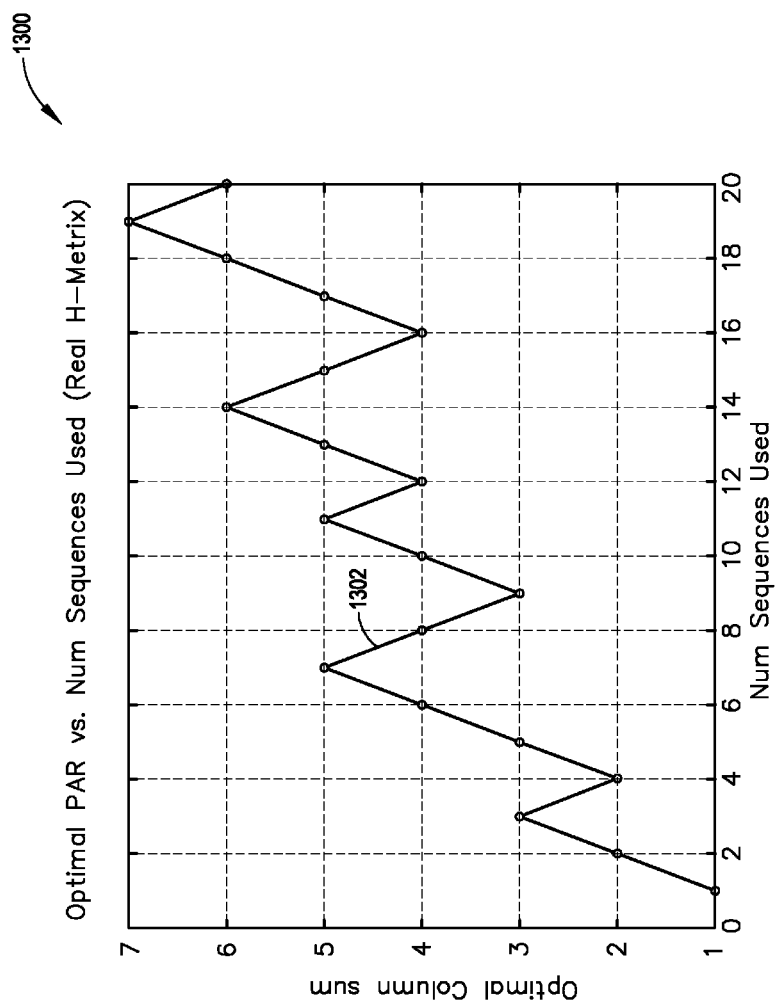
FIG. 13 shows an example graph of number of rows stimulated versus optimal column sum.

FIG. 13 shows a graph 1300 of the number of sequences used versus lowest maximum absolute value column sum 1302. Finding the matrices with lowest maximum absolute value of column sums keeps the absolute value of the column sum (and therefore the amplitude at the receiver) from growing linearly or faster than linearly, and instead grows only at about the square root of the number of sequences used.

Figure 17:
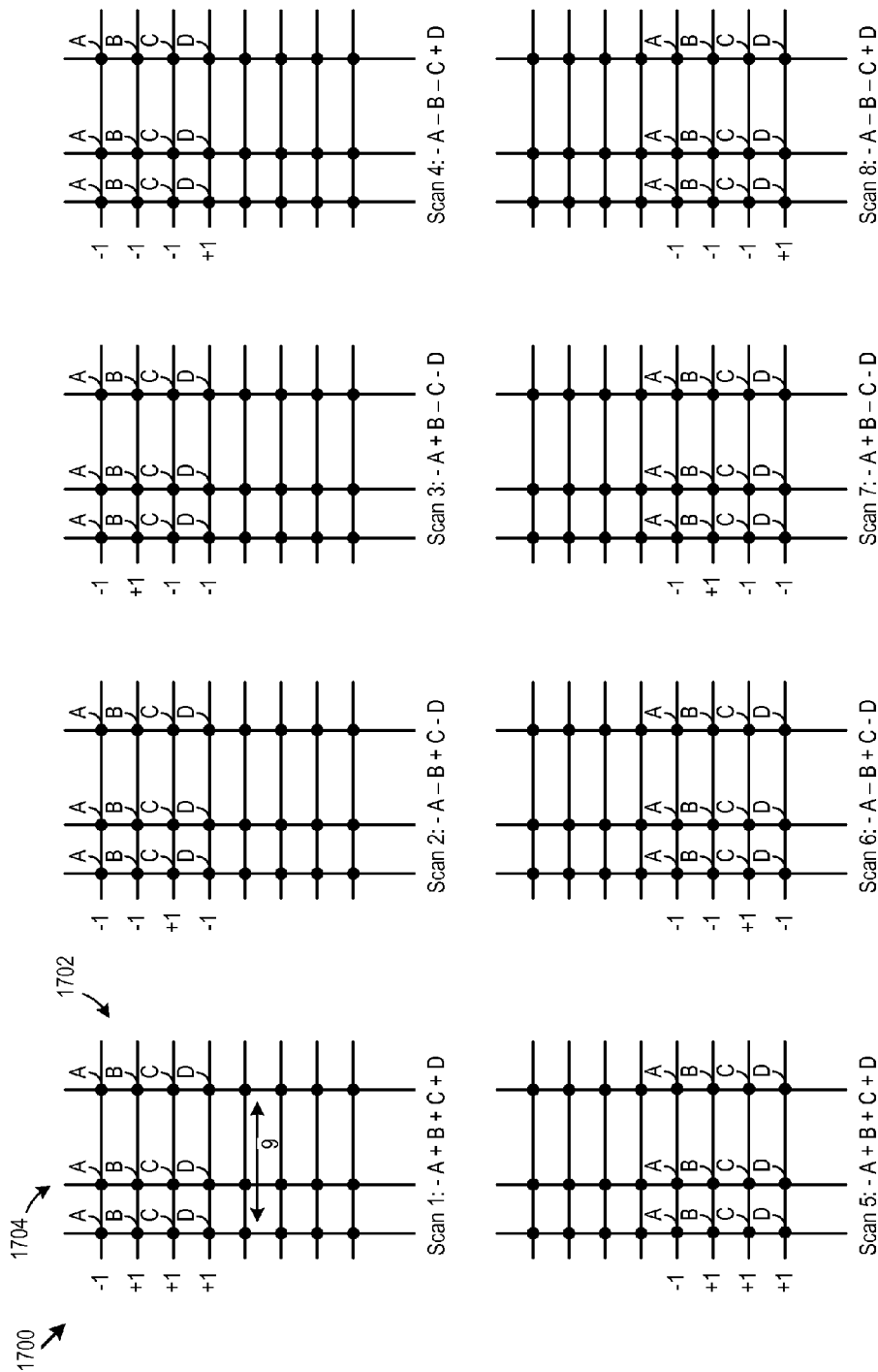
FIG. 17 shows an example of scanning an 8 row by 9 column touch panel with orthogonal signals.

Turning ahead to FIG. 17, that Figure shows an example of a touch panel grid 1700 scanned using the H'4 matrix. In this example, the touch panel grid 1700 includes eight rows 1702 and nine columns 1704. The pixels in each of the nine columns that are energized at the same time are labeled A, B, C, and D. As illustrated in FIG. 17 the OMS logic 1210 may drive four rows (all the way across the nine rows) simultaneously on the first scan with −1, +1, +1, +1 signals; then the same four rows on the second scan with −1, −1, +1, −1 signals; then the same four rows on the third scan with −1, +1, −1, −1 signals; then the same four rows on the fourth scan with −1, −1, −1, +1 signals. After taking the receiver measurements after each scan, the OMS logic 1210 processes the four receiver measurements for each of the nine columns to obtain the four individual pixel values A, B, C, and D in each of the nine columns by solving for four variables using the four orthogonal measurements −A+B+C+D; −A−B+C−D; −A+B−C−D; −A−B−C+D.

An example set of matrices that the OMS logic 1210 may use is given below (transposed with respect to the examples noted above), along with a table showing the maximum row sum. Note that the Hadamard matrices are generally of size 4 k, (e.g., 8), but that any number of rows (e.g., 7) may be scanned. In the case where fewer rows are scanned than the matrix supports, the OMS logic 1210 may determine which rows or columns from the Hadamard matrices to apply, giving consideration to minimizing the amplitude of the received signal. Examples are given below for the rows to choose for non integer multiples of 4 rows (e.g., scanning 6 rows with an 8×8 matrix, use the first six rows of the 8×8 matrix noted below). As another specific example, scanning a touch panel with 15 rows, the OMS logic 1210 may use a 4×4 matrix to scan the first, second, and third sets of four rows, then obtain four measurements again over the last three rows using the first three rows of the 4×4 matrix to scan the remaining three rows (thereby taking four measurements to solve for three variables, but gaining SNR though an extra measurement is made).

As noted above, the OMS logic 1210 may use Hadamard sequences to modulate the polarity of the transmitters during individual step scans. The format for a Hadamard matrix is:

$$H^{NumSteps,NumRows} = \begin{bmatrix} H_{0,0} & \cdots & H_{0,NumRows-1} \\ \vdots & \ddots & \vdots \\ H_{NumSteps-1,0} & \cdots & H_{NumSteps-1,NumRows-1} \end{bmatrix}$$

The superscript of H (if shown) is used to depict the dimensions of the Hadamard matrix. Using this terminology, each column in the matrix H represents a single Hadamard sequence. Properties of Hadamard matrices, include:

All entries in the H matrix are either +1 or −1.

All columns are orthogonal to every other column. (Similarly, all rows are orthogonal to every other row.).

Valid values of NumSteps is 1, 2, or any integer multiple of 4.

NumRows≤NumSteps.

Given this notation, HNumSteps,NumRows(j) is the jth column vector of HNumSteps,NumRows.

Below is a list of Hadamard matrices that the OMS logic 1210 may support. The matrices may be pre-stored in the memory 1206. In the matrices below, only the polarity of the entries is shown; therefore '+' indicates a value of +1 and '−' indicates a value of −1.

As will be detailed in the matrices below, given a matrix $H^{N,N}$, where N is a multiple of 4, one can construct $H^{N,N-1}$, $H^{N,N-2}$, $H^{N,N-3}$ by choosing the first N-1, N-2, or N-3 columns of the full N-by-N matrix. Therefore, only $H^{N,N}$ need be stored on-chip (e.g., in the memory 1206).

The table below for each $H^{N,k}$ matrix shows the maximum of the absolute value of the row-sums of the matrix. The control circuitry 104 may use the maximum sum parameter for dynamic range scaling within the analog front end to the touch panel 1212.

$H^{1,1}$ and $H^{2,2}$:

$$H^{1,1} = [+]$$
$$H^{2,2} = \begin{bmatrix} + & + \\ + & - \end{bmatrix}$$
$$H^{2,1} = \begin{bmatrix} + \\ + \end{bmatrix}$$

a) $H^{4,4}$ $$H^{4,4} = \begin{bmatrix} + & - & + & + \\ + & + & + & - \\ + & - & - & - \\ + & + & - & + \end{bmatrix}$$

$H^{4,3} = [H^{4,4}(1:3)]$ b) $H^{8,8}$ $$H^{8,8} = \begin{bmatrix} - & + & + & + & + & - & - & + \\ - & - & + & - & + & - & - & - \\ - & + & - & - & + & + & + & - \\ - & - & - & + & + & - & + & + \\ - & + & + & + & - & - & + & - \\ - & + & + & - & - & - & + & - \\ - & - & + & - & - & + & + & + \\ - & + & - & - & - & - & - & + \\ - & - & - & + & - & + & - & - \end{bmatrix}$$

$H^{8,7} = [H^{8,8}(1:7)]$
$H^{8,6} = [H^{8,8}(1:6)]$
$H^{8,5} = [H^{8,8}(1:5)]$ c) $H^{12,12}$ $$H^{12,12} = \begin{bmatrix} - & + & - & + & - & - & - & - & + & - & + & - \\ - & - & + & + & + & + & + & - & + & - & - & - \\ - & + & + & - & - & + & + & + & + & - & + & + \\ - & - & - & - & + & - & + & + & - & - & + & - \\ - & + & + & + & + & - & + & - & + & + & - \\ - & + & - & - & - & + & + & - & - & + & - & - \\ - & + & - & + & + & - & + & + & + & + & - & + \\ - & - & - & + & - & + & - & + & - & - & - & + \\ - & - & + & - & - & + & - & - & + & + & + \\ - & - & + & - & - & - & - & + & + & + & - & - \\ - & + & + & - & + & - & - & - & - & - & - & + \\ - & - & - & - & + & + & - & - & + & + & + & + \end{bmatrix}$$

$H^{12,11} = [H^{12,12}(1:11)]$
$H^{12,10} = [H^{12,12}(1:10)]$
$H^{12,9} = [H^{12,12}(1:9)]$ d) $H^{16,16}$ $$H^{16,16} = \begin{bmatrix} - & + & - & + & - & - & + & + & + & + & + & + & - & - & + \\ - & - & - & - & - & + & + & - & + & - & + & - & + & + & - & - \\ - & + & + & - & - & - & - & - & + & + & - & - & + & - & + & - \\ - & - & + & - & + & - & + & + & - & - & + & + & + & + \\ - & + & - & + & + & + & - & - & + & + & + & + & - & + & + & - \\ - & - & - & + & - & + & + & - & + & - & + & - & + & - & + \\ - & + & + & - & + & + & + & + & - & - & - & - & + & - & + \\ - & - & + & + & - & + & - & + & - & - & + & - & - & - \\ - & + & - & + & - & - & + & + & - & - & - & - & + & + & - \\ - & - & - & - & + & + & - & + & - & + & - & - & + & + \\ - & + & + & - & - & - & - & - & + & + & - & + & - & + \\ - & - & + & - & + & - & + & - & + & + & - & - & - & - \\ - & + & - & + & + & - & - & - & - & - & + & - & - & + \\ - & - & - & + & - & - & + & - & + & - & + & + & + & - & - \\ - & + & + & - & + & + & + & - & - & + & + & + & - & + & - \\ - & - & + & + & - & + & - & - & + & - & + & - & + & + & + \end{bmatrix}$$

$H^{16,15} = [H^{16,16}(1:15)]$
$H^{16,14} = [H^{16,16}(1:14)]$
$H^{16,13} = [H^{16,16}(1:13)]$

The matrices listed above have column sums as follows:

| Matrix | Sum |
|---|---|
| $H^{1,1}$ | 1 |
| $H^{2,2}$ | 2 |
| $H^{4,3}$ | 3 |
| $H^{4,4}$ | 2 |
| $H^{8,5}$ | 3 |
| $H^{8,6}$ | 4 |
| $H^{8,7}$ | 5 |
| $H^{8,8}$ | 4 |
| $H^{12,9}$ | 3 |
| $H^{12,10}$ | 4 |
| $H^{12,11}$ | 5 |
| $H^{12,12}$ | 4 |
| $H^{16,13}$ | 5 |
| $H^{16,14}$ | 6 |
| $H^{16,15}$ | 5 |
| $H^{16,16}$ | 4 |

Note also that the OMS logic 1210 may use complex Hadamard matrices that can be constructed for any N, as shown in the example below 6×6 Fourier matrix:

$$H_6 = \begin{bmatrix} 1 & 1 & 1 & 1 & 1 & 1 \\ 1 & -1 & j & -j & -j & j \\ 1 & j & -1 & j & -j & -j \\ 1 & -j & j & -1 & j & -j \\ 1 & -j & -j & j & -1 & j \\ 1 & j & -1 & -1 & j & -1 \end{bmatrix}$$

In that regard, the touch panel interface 1218 may include two digital to analog converters that generate the inphase and quadrature (I/Q) signals. Thus, the OMS logic 1218 may effective drive the touch panel 1212 with a complex H-matrix with +1/−1/j/−j entries, and this can extend to matrices of size 2 k. The I/Q signals can be sinewaves, for example. Column sums can be further reduced using I/Q signals as shown in the table below:

| N | Optimal sum with Complex H | Optimal sum with real H |
|---|---|---|
| 4 | 2 | 2 |
| 6 | 2.83 | 4 |
| 8 | 2.83 | 4 |
| 10 | 3.16 | 4 |
| 12 | 4 | 4 |

Furthermore, the matrices may have zero-valued entries without adding any hardware complexity, though there may be a slight SNR penalty from lowered signal energy. The example below shows an example of a 6×6 matrix including zeros.

$$H_6 = \begin{bmatrix} -1 & -1 & -1 & -1 & -1 & 0 \\ 1 & -1 & 1 & -1 & 0 & 1 \\ 1 & 1 & -1 & 0 & -1 & 1 \\ 1 & -1 & 0 & 1 & -1 & -1 \\ 1 & 0 & -1 & -1 & 1 & -1 \\ 0 & 1 & 1 & -1 & -1 & -1 \end{bmatrix}$$

Figure 14:
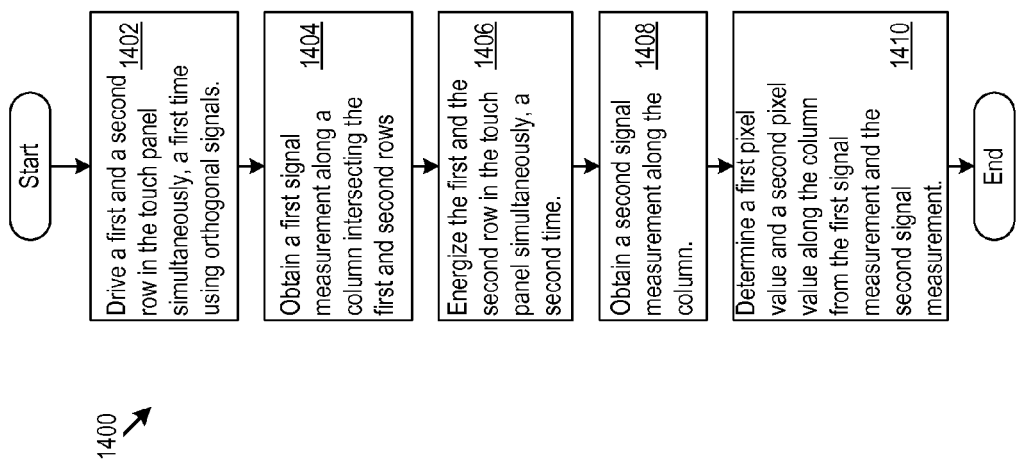
FIG. 14 shows an example of the logic that the orthogonal multi-row stimulation logic may implement.

FIG. 14 shows an example of the logic 1400 that the OMS logic 1210 may implement. The OMS logic 1210 may drive a first and a second row in the touch panel simultaneously, a first time (1402). The OMS logic 1210 may obtain a first signal measurement along a column intersecting the first and second rows (1404). The OMS logic 1210 may then energize the first and the second row in the touch panel simultaneously, a second time (1406) and obtain a second signal measurement along the column (1408). The OMS logic 1210 may then determine a first pixel value and a second pixel value along the column from the first signal measurement and the second signal measurement (1410). The logic 1400 may be extended to cover any number of simultaneously scanned rows (e.g., 4 or 8 rows at a time) using the matrices described above.

The memory 1206 may also store asymmetric scanning (AS) logic 1220 that operates as directed or configured by the AS parameters 1222. The AS logic 1220 may be part of or called by the OMS logic 1210, as examples, or may be a separate program or set of firmware instructions executed by the processor 1204. The AS logic 1220 helps address the fact that capacitive touch panels may have many input/output (I/O) lines to be scanned across the full touch panel, but that, in many cases, only a subset of the entire touch panel has "interesting" activity present within it. Accordingly, the AS logic 1220 may avoid the resource cost of scanning the entire touch panel 1212, and thereby save power and increase responsiveness and effective frame rate. Furthermore, touch activity from a small object (such as a stylus or small finger) would have reduced signal strength, and the AS logic 1220 may beneficially allocate additional scan time to that region to better read and facilitate better interpretation of the low signal strength signals.

In that regard, the AS logic 1220 may recognize the regions in which certain activity of interest is occurring on the touch panel 1212, and adaptively reconfigure the scanning to spend more or less time in such regions. As a result, the AS logic 1220 helps provide high SNR and high effective frame rate at low power because the AS logic 1220 may scan just a subset of the full touch panel 1212 to focus on activity of interest.

The AS logic 1220 may be configured (e.g., through the AS parameters 1222) to determine that certain categories of activity on the touch panel 1212 warrant focused attention through asymmetric scanning (e.g., increased SNR on demand for specific areas). In one embodiment, any interaction (e.g., by touch or hover) qualifies as a category for focused attention, while areas that are not presently touched qualify as a category for which no focused attention is needed. However, the AS logic 1220 may still scan those areas to determine when the currently untouched areas become touched. Additionally or alternatively, areas on the touch panel 1212 with low SNR (e.g., the signal is low or the noise is high) may qualify as focused attention category areas. Thus, for example, the AS logic 1220 may attempt to compensate for high noise in certain areas of the touch panel 1212 by giving them focused attention. As another example, the AS logic 1220 may attempt to better determine activity for low signal areas of the touch panel 1212, such as might result from a 'hover touch' (e.g., an interaction with the touch panel 1212 without physical contact on the touch panel 1212) or the use of a fine tip stylus. In other words a touch on a capacitive touch panel may be a matter of signal strength and proximity rather than a matter of physical deformation or actual contact with the touch panel. A further benefit of the asymmetric scan technique is that areas of the panel that have no interesting activity may not need to be scanned as frequently, as long, or with as much energy, leading to frame rate improvements, and more generally to the flexibility to balance performance, accuracy, frame rate, and power consumption for the overall panel scanning task.

In one implementation, the AS logic 1220 supports asymmetric panel scanning by scanning any region of interest (e.g., particular rows on the touch panel 1212) more frequently than other rows. Note that although an entire row at a time may be driven, if only particular pixels in the row are of interest (e.g., are included in the region of interest), then the control circuitry 104 may power down the receivers for the columns in which the pixels exist to save power and computational resources to determine pixel values in columns that are not of interest. The achievable SNR of a pixel in a given row is directly proportional to the number of step scans over which its row is stimulated. By default, this value (stored, e.g., as an AS parameter 1222) is equal to "Nmulti," but under certain scenarios the AS logic 1220 may determine that additional SNR is warranted for a specific region(s) of the panel meeting certain criteria such as those identified above.

Accordingly, the AS logic 1220 may determine that certain rows in the touch panel 1212 will be stimulated with additional scan steps beyond the number given by the Nmulti parameter for the entire frame scan. The number of scan steps for the rows forms an asymmetric scan map 1224 for the touch panel 1212. Furthermore, the AS logic 1220 may follow selected rules, any of which may be made mandatory or optional, and which may be represented in the AS parameters 1222 (or in other ways) when determining the asymmetric scan map 1224. Example rules include:

Rule 1) The AS logic 1220 should perform asymmetric scan on a row-by-row basis. In other words, all pixels in a given row shall be stimulated in an identical fashion.

Rule 2) The number of scan steps that any given row can be stimulated (given, for example by the "Nscan" parameter in the AS parameters 1222) may be equal to one of the following values: {0, 1, 2, 4, 8, 12, 16}.

Rule 3 (optional) The number of rows simultaneously stimulated (i.e., Nmulti) may be equal to an integer multiple of the number of step scans that those rows should be stimulated (i.e., as given by the Nscan parameter among the AS parameters 1222). In the asymmetric scan maps 1224, this manifests as the constraint that there be an integer multiple of Nscan adjacent rows with the same value of Nscan.

Some examples asymmetric scan maps 1224 and resultant control flows are described next. In view of Rule 1, the scan map 1224 may be specified as a 1-dimensional vector. For the purposes of illustration, however, the scan maps 1224 are shown as a 2-d matrix representing the two dimensional touch panel.

Figure 5:
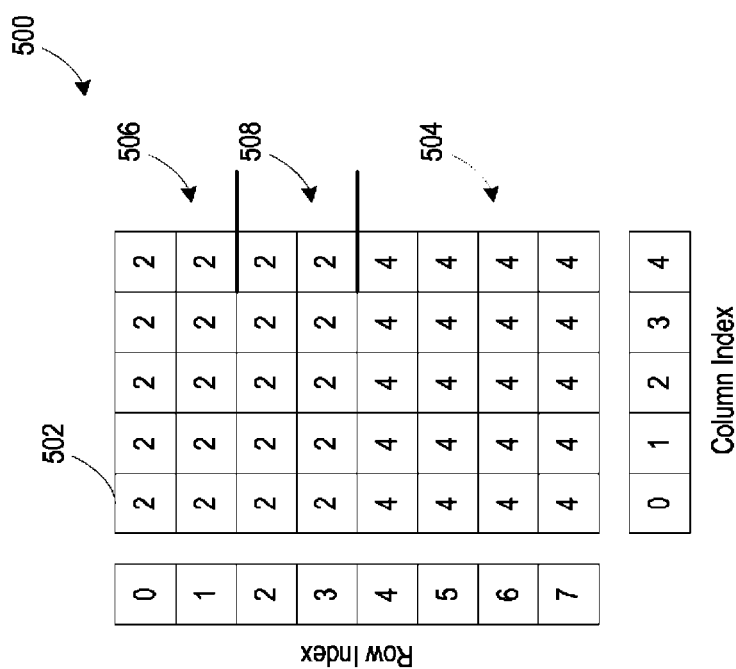
FIG. 5 shows an example first sample asymmetric scan map.

FIG. 5 shows an example of a scan map 500. The eight rows are labeled 0-7 and the five columns are labeled 0-4. In each pixel (e.g., pixel 502), there is a number, Nscan, (e.g., "2") indicating the number of step scans that the AS logic 1220 will perform in that pixel. The scan map 500 follows the 3 rules outlined above. It can be seen by inspection that Rules 1 and 2 are observed. Furthermore, it can be seen that optional Rule 3 is observed, as there are 4 adjacent rows that have Nscan=4 (the rows 504) and four adjacent rows that have Nscan=2 (the rows 506 and 508).

Based on the example scan map 500, the AS logic 1220 may implement the following step scan instructions for scanning the touch panel 1212:

| Step Scan Number | Tx Rows Active | Hadamard sequence used (see above concerning the OMS logic 1210 for more details on the Hadamard matrices) |
|---|---|---|
| 1 | 0, 1 | H2, 2 (1) |
| 2 | 0, 1 | H2, 2 (2) |
| 3 | 2, 3 | H2, 2 (1) |
| 4 | 2, 3 | H2, 2 (2) |
| 5 | 4, 5, 6, 7 | H4, 4 (1) |
| 6 | 4, 5, 6, 7 | H4, 4 (2) |
| 7 | 4, 5, 6, 7 | H4, 4 (3) |
| 8 | 4, 5, 6, 7 | H4, 4 (4) |

In the table above, the AS logic 1220, for step scans 1 and 2, performs an Nmulti=2 scan of rows 0 and 1. The AS logic 1220 also, for steps 3 and 4, performs the same scan on rows 3 and 4. The AS logic 1220, for steps 5 to 8, performs an Nmulti=4 scan of rows 4 to 7. In other words, the scan map 500 results in the AS logic 1220 performing an asymmetric scan of the touch panel 1212 in a very efficient manner. The AS logic 1220 has effectively partitioned the touch panel 1212 into sub-panels, and uses the OMS logic 1210 noted above to perform the scanning of each sub-panels (e.g., each set of rows 504, 506, and 508).

Figure 6:
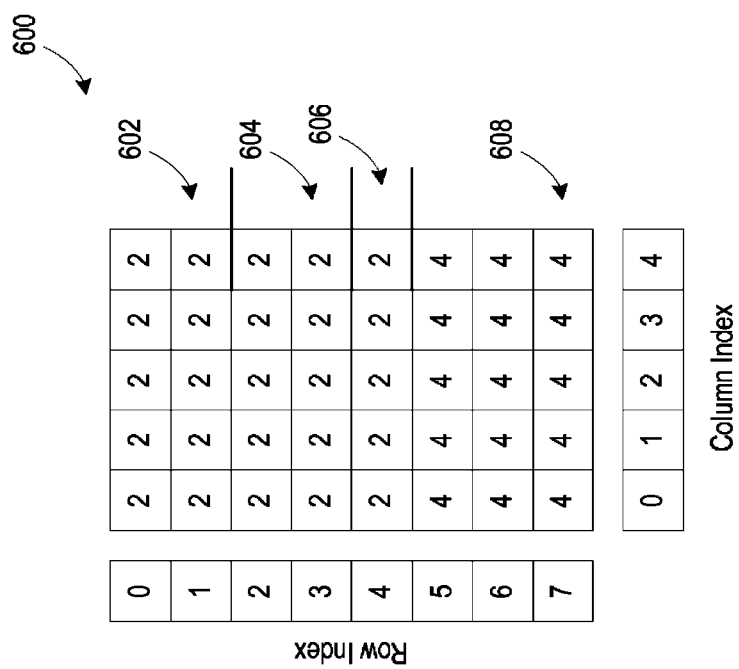
FIG. 6 shows an example second sample asymmetric scan map.

FIG. 6 shows another example of a scan map 600 that the AS logic 1220 may implement, although it may be somewhat less efficient than the scan map 500. The scan map 600 includes row sets 602, 604, 606, and 608.

In the example shown in FIG. 6, the scan map 600 is modified slightly compared to the scan map 500. In particular, the Nscan parameter for the row that is part of row set 606 is reduced from 4 to 2. The scan map 600 follows the Rules 1 and 2 above, but does not follow the optional Rule 3, as there are five adjacent rows with Nscan=2 and three adjacent rows with Nscan=4.

The AS logic 1220 may execute more scan sequence steps for the scan map 600 than in the example of FIG. 5. One example is:

| Step Scan Number | Tx Rows Active | Hadamard sequence used |
|---|---|---|
| 1 | 0, 1 | H2, 2 (1) |
| 2 | 0, 1 | H2, 2 (2) |
| 3 | 2, 3 | H2, 2 (1) |
| 4 | 2, 3 | H2, 2 (2) |
| 5 | 4 | H2, 1 (1) |
| 6 | 4 | H2, 1 (2) |
| 7 | 5, 6, 7 | H4, 3 (1) |
| 8 | 5, 6, 7 | H4, 3 (2) |
| 9 | 5, 6, 7 | H4, 3 (3) |
| 10 | 5, 6, 7 | H4, 3 (4) |

In this example, not following optional Rule 3 resulted in the AS logic 1220 using a larger number of scan steps (10) than in the previous example (8).

Figure 15:
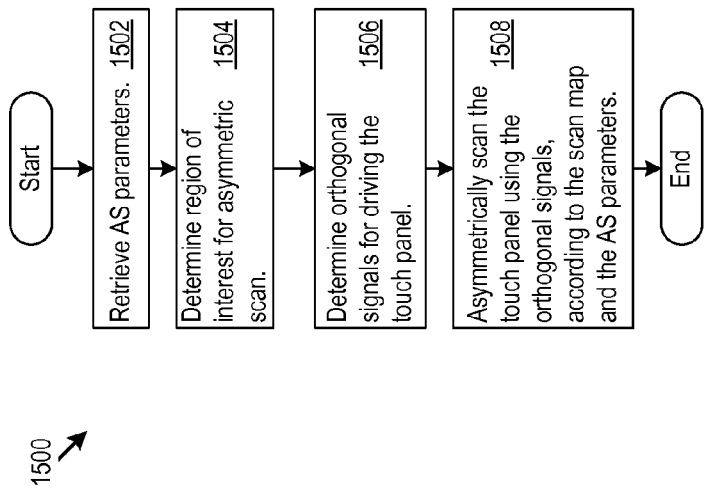
FIG. 15 shows an example of the logic that the asymmetric scan logic may implement.

Turning ahead to FIG. 15, that FIG. 15 shows an example of logic 1500 that the AS logic 1220 may implement. The AS logic 1220 retrieves the AS parameters 1222 and scan map 1224, including as examples, Nmulti, and Nscan (1502). The AS logic 1220 may also receive an identification or determine one or more regions of interest on the touch panel 1212 for asymmetric scanning (e.g., to increase SNR in that region) (1504). The number of step scans per row may be increased in an attempt to increase the SNR to any desired level (e.g., to 2 step scans, 4, 8, 12, 16, and so on according to the orthogonal signal options noted above with respect to the OMS logic 1210). In some implementations, the SNR increase is proportional to the number of step scans used. As a result, it is possible to determine the number of steps scans needed to achieve a target SNR. The AS logic also determines the orthogonal signals for driving the touch panel 1212 (1506). For example, the AS logic 1220 may use the Hadamard matrices identified above to drive the sets of rows as identified in the scan map. The scan map may be constructed to provide additional step scans in the regions of interest on the touch panel 1212. The AS logic 1220 then executes asymmetric scanning of the touch panel 1212 using the orthogonal signals according to the scan map and the AS parameters 1222 (1508) to focus on the region(s) of interest.

In some implementations, the AS logic 1220 collects asymmetric scan requests from the host or other higher level logic, while the control circuitry 104 is performing regular, non asymmetric scans of the touch panel 1212. For each area where interaction with the touch panel 1212 is detected (e.g., an area referred to as a "blob" due to decreases in raw capacitance value (or increases in delta capacitance value, untouched minus touched) in the heat map across multiple pixels at or near where an interaction with a finger or stylus (as examples) is occurring), the AS logic 1220 may determine the SNR (e.g., using noise estimates from a non active region of the touch panel 1212). The AS logic 1220 may then, if the SNR is below a predefined target SNR (e.g., because the signal is too low), request (e.g., initiate) increased SNR in the area of the blob through asymmetric scanning. If the SNR then increases past a second predefined threshold, then the AS logic 1220 may stop the asymmetric scan in the blob region, e.g., because the SNR is now sufficient to track the interaction without additional focus through asymmetric scanning.

The AS logic 1220 (or other logic in the system) may also predict the blob position and request increased SNR in the predicted position. For example, the AS logic 1220 may use motion estimation for the blob over time to estimate velocity and thus the next predicted position. Between scans of the touch panel 1212, the blob may be recognized using a shape recognition algorithm, or by closeness to the last blob position (because blobs do not tend to move quickly in comparison to the scan frame rate). For example, the predicted position may be the predicted position in one to two frames (or some other configurable parameter in the AS parameters 1222) in the future. The predicted position may be identified by rows, with a configurable parameter number of additional rows above and/or below the predicted position. Another parameter, a capacitance threshold, may determine whether any part of the touch panel area belongs to the blob. The AS logic 1220 may also find the connected components of touch panel areas above the capacitance threshold to identify the blob. The SNR of the blob, for determining when to start or stop asymmetric scanning, may be determined by the peak (highest delta in capacitance value) pixel in the blob, squared, and dividing by the noise variance estimate. The AS logic 1220 may also communicate with other logic in the system, to inform the other logic about how the asymmetric scanning was done. For example, the AS logic 1220 may communicate the number of scan steps per row, the measured capacitance data, noise estimates, or any other data to other logic in the system. In some implementations, the system may perform its analysis not on raw capacitance values, but on delta capacitance: the difference between capacitance when the touchscreen is not touched, and the current reading. The current reading (the raw capacitance) decreases in the presence of a touch.

Figure 16:
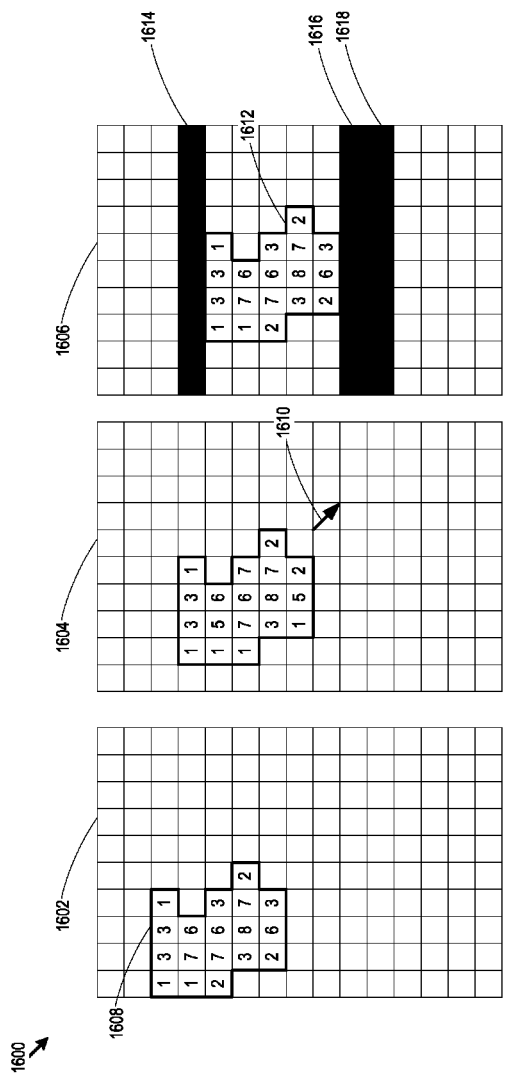
FIG. 16 shows an example of blob prediction.

FIG. 16 shows blob position prediction using an example of series 1600 of frames 1602, 1604, 1606 (of 15 columns and 10 rows) over time in which a blob 1608 exists. The capacitance measurements (e.g., delta capacitance) of the pixels in the blob are noted in the frame 1600. The values are for illustration only and not meant to be representative of actual measurements. The AS logic 1220 has predicted the velocity vector 1610 (in this example, one pixel to the right and down) and has predicted a next location 1612 for the blob. The AS logic 1220 has established buffer rows 1614, 1616, 1618 that are also asymmetrically scanned as a guard on the estimated position 1612 to protect against unexpected changes in velocity or next position of the blob 1608. The predicted next location 1612 and the buffer rows 1614-1618 thus identifying the rows over which asymmetric scanning may occur in an upcoming frame. The AS logic 1220 may establish any number of buffer rows or columns above the predicted location, below the predicted location, to the left or to the right, or any combination thereof. Column processing logic may be enabled for the buffer columns, and disabled for the remaining columns, for example. The number of buffer rows may increase as the predicted velocity vector increases.

One motivation for performing blob position prediction is system processing delays. In particular, after the AS logic 1220 receives a request for asymmetric scan, the blob of interest may have moved. Therefore the region of interest may not be exactly the same region of interest originally specified for asymmetric scan. Accordingly, when position prediction is enabled (e.g., as set by an activation parameter in the AS parameters 1222), the AS logic 1220 may take the blob movement into account by predicting where the blob will be by the time that asymmetric scan starts. In other words, given a prediction of blob motion (e.g., a velocity vector) and the time until the scan starts, the AS logic may determine an adjusted region of interest that is predicted to include the blob when the asymmetric scan is actually carried out.

After the asymmetric scan, the results are returned to the asymmetric scan requesting logic. Per row, the requesting logic thus knows what the noise estimate is, as it may vary across the rows as a result of the asymmetric scan. The requesting logic may then determine the blob shape and location based on the SNR as noted above. When the SNR is above a threshold, then the requesting logic may end the asymmetric scan. The requesting logic may also implement debouncing to prevent reactivation of asymmetric scan between individual frames. In one implementation, the requesting logic may wait to have two or three frames (or some other configurable debouncing parameter number) with strong SNR before it ends asymmetric scan, or some configurable number of frames with low SNR before it begins asymmetric scan. When there are multiple blobs on the same row, the AS logic 1220 may select the number of step scans needed to try to achieve a desired level of SNR for any particular blob (e.g., to increase the SNR for the weakest blob to a desired level).

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method, comprising:
   energizing a first and a second row in a touch panel simultaneously, a first time;
   obtaining a first signal measurement along a column intersecting the first and second rows while energizing the first time;
   energizing the first and the second row in the touch panel simultaneously, a second time;
   obtaining a second signal measurement along the colum while energizing the second time;
   determining a first pixel value along the column responsive to the first signal measurement and the second signal measurement; and
   determining a second pixel value along the column responsive to the first signal measurement and the second signal measurement.

2. The method of claim 1, where energizing the first and second times comprise:
   energizing with signals modulated by a real or complex valued Hadamard sequence.

3. The method of claim 1, where energizing the first time and the second time comprise energizing with orthogonal signals.

4. The method of claim 1, further comprising obtaining first additional signal measurements along additional columns intersecting the first and second rows after energizing the first time.

5. The method of claim 4, further comprising obtaining second additional signal measurements along the additional columns intersecting the first and second rows after energizing the second time.

6. The method of claim 5, further comprising determining additional first and second pixel values along the additional columns from the first and second additional signal measurements.

7. The method of claim 1, where energizing occurs in response to an instruction to increase signal-to-noise ratio.

8. Control circuitry, comprising:
   a touch panel interface;
   a memory comprising scanning logic; and
   a controller in communication with the memory and the touch panel interface, the controller operable, when the scanning logic is executed, to:
      energize a first and a second row in the touch panel simultaneously, a first time;
      obtain a first signal measurement along a column intersecting the first and second rows when the first and second rows are energized the first time;
      energize the first and the second row in the touch panel simultaneously, a second time;
      obtain a second signal measurement along the column when the first and second rows are energized the second time;
      determine a first pixel value along the column responsive to the first signal measurement and the second signal measurement; and
      determine a second pixel value along the column responsive to the first signal measurement and the second signal measurement.

9. The control circuitry of claim 8, where the first and second rows are energized with signals modulated by a Hadamard sequence.

10. The control circuitry of claim 8, where the scanning logic causes the controller to energize the first time and the second time with orthogonal signals.

11. The control circuitry of claim 8, where the scanning logic causes the controller to obtain first additional signal measurements along additional columns intersecting the first and second rows after energizing the first time.

12. The control circuitry of claim 11, where the scanning logic causes the controller to obtain second additional signal measurements along the additional columns intersecting the first and second rows after energizing the second time.

13. The control circuitry of claim 12, where the scanning logic causes the controller to determine additional first and second pixel values along the additional columns from the first and second additional signal measurements.

14. The control circuitry of claim 8, where the controller is operable to energize in response to an instruction to increase signal-to-noise ratio.

15. A product comprising:
   a computer readable medium other than a transitory signal; and
   scanning logic stored on the medium and operable to, when executed by a controller:
      energize a first and a second row in a touch panel simultaneously, a first time;
      obtain a first signal measurement along a column intersecting the first and second rows when the first and second rows are energized the first time;
      energize the first and the second row in the touch panel simultaneously, a second time;
      obtain a second signal measurement along the column when the first and second rows are energized the second time;
      determine a first pixel value along the column responsive to the first signal measurement and the second signal measurement; and
      determine a second pixel value along the column responsive to he first signal measurement and the second signal measurement.

16. The product of claim 15, where the scanning logic causes the controller to energize the first time and the second time with orthogonal signals obtained using a real or complex valued Hadamard sequence.

17. The product of claim 15, where the scanning logic causes the controller to obtain first additional signal measurements along additional columns intersecting the first and second rows after energizing the first time.

18. The product of claim 17, where the scanning logic causes the controller to obtain second additional signal measurements along the additional columns intersecting the first and second rows after energizing the second time.

19. The product of claim 18, where the scanning logic causes the controller to determine additional first and second pixel values along the additional columns from the first and second additional signal measurements.

20. The product of claim 15, where the scanning logic is operable to energize in response to an instruction to increase signal-to-noise ratio.

* * * * *

UNITED STATES PATENT AND TRADEMARK OFFICE
CERTIFICATE OF CORRECTION

| | |
|---|---|
| PATENT NO. | : 8,937,606 B2 |
| APPLICATION NO. | : 13/414985 |
| DATED | : January 20, 2015 |
| INVENTOR(S) | : David A. Sobel et al. |

It is certified that error appears in the above-identified patent and that said Letters Patent is hereby corrected as shown below:

<u>In the Claims</u>

In column 29, claim 1, line 10, after "measurement along the" replace "colum" with --column--.

In column 30, claim 15, line 40, before "first signal measurement" replace "he" with --the--.

Signed and Sealed this
Twenty-first Day of April, 2015

Michelle K. Lee
*Director of the United States Patent and Trademark Office*